(12) United States Patent
Raab et al.

(10) Patent No.: US 10,401,189 B2
(45) Date of Patent: *Sep. 3, 2019

(54) METHOD AND SYSTEM FOR INTEGRATED SATELLITE ASSISTANCE SERVICES

(71) Applicant: DISH NETWORK CORPORATION, Englewood, CO (US)

(72) Inventors: Stefan Bernard Raab, South Riding, VA (US); David Robert Zufall, Reston, VA (US); Gerard Daniel Mulford, North Potomic, MD (US); Mariam Aghdasi Sorond, Reston, VA (US); Marcus John Le Maitre, Leesburg, VA (US)

(73) Assignee: DISH Network Corporation, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,343

(22) Filed: Mar. 16, 2018

(65) Prior Publication Data

US 2018/0202829 A1 Jul. 19, 2018

Related U.S. Application Data

(63) Continuation of application No. 14/321,559, filed on Jul. 1, 2014, now Pat. No. 9,939,286, which is a
(Continued)

(51) Int. Cl.
*G01C 21/36* (2006.01)
*H04M 1/725* (2006.01)
(Continued)

(52) U.S. Cl.
CPC .... *G01C 21/3682* (2013.01); *H04M 1/72536* (2013.01); *H04W 48/18* (2013.01); *H04M 1/2535* (2013.01); *H04M 2250/22* (2013.01)

(58) Field of Classification Search
CPC .............. G01C 21/3682; H04W 48/18; H04M 1/72536; H04M 1/2535; H04M 2250/22
See application file for complete search history.

(56) References Cited

U.S. PATENT DOCUMENTS

| 4,992,947 A | 2/1991 | Nimura et al. |
| 5,394,561 A | 2/1995 | Freeburg |

(Continued)

FOREIGN PATENT DOCUMENTS

| EP | 1635482 A1 | 3/2006 |
| WO | 2007047370 A2 | 4/2007 |

OTHER PUBLICATIONS

U.S. Appl. No. 14/321,559, Issue Notice, dated Mar. 22, 2018, 1 page.
(Continued)

*Primary Examiner* — Bobbak Safaipour
(74) *Attorney, Agent, or Firm* — Wash Park IP Ltd.; John T. Kennedy

(57) ABSTRACT

A computing device includes a display screen and is configured to generate and display an interactive map identifying at least one route segment. The route segment may be generated in view of a current location of the computing device and at least one of arises within a destination area, and/or connects the current location of the computing device with at least one destination or a service provider. The computing device may be configured to receive a selection of at least one of a route segment, a destination area, a destination, and a service provider and to activate at least one additional process for execution thereby. One additional process may include activating a navigation module configured to generate directions between the current location and the selection. The additional process may include outputting
(Continued)

the directions in a humanly perceptible format. A route segment may be based on historical data.

18 Claims, 21 Drawing Sheets

Related U.S. Application Data continuation of application No. 13/793,233, filed on Mar. 11, 2013, now Pat. No. 8,805,435, which is a continuation of application No. 13/619,938, filed on Sep. 14, 2012, now Pat. No. 8,626,231, which is a continuation of application No. 12/042,204, filed on Mar. 4, 2008, now Pat. No. 8,457,682.

(51) Int. Cl.
*H04W 48/18* (2009.01)
*H04M 1/253* (2006.01)

(56) References Cited

U.S. PATENT DOCUMENTS

| | | | |
|---|---|---|---|
| 5,758,261 A | 5/1998 | Wiedeman | |
| 5,919,246 A | 7/1999 | Waizmann et al. | |
| 6,212,473 B1 | 4/2001 | Stefan et al. | |
| 6,269,304 B1 | 7/2001 | Kaji et al. | |
| 6,360,167 B1 | 3/2002 | Millington et al. | |
| 6,377,981 B1 | 4/2002 | Ollikainen et al. | |
| 6,405,129 B1 | 6/2002 | Yokota | |
| 6,484,094 B1 | 11/2002 | Wako | |
| 6,487,496 B2 | 11/2002 | Katayama et al. | |
| 6,505,118 B2 | 1/2003 | Chowanic et al. | |
| 6,522,865 B1 | 2/2003 | Otten | |
| 6,711,474 B1 | 3/2004 | Treyz et al. | |
| 6,714,760 B2 | 3/2004 | Robinett | |
| 6,714,860 B1 | 3/2004 | Wawra et al. | |
| 6,741,834 B1 | 5/2004 | Godwin | |
| 6,771,742 B2 | 8/2004 | McCalmont et al. | |
| 6,816,778 B2 | 11/2004 | Diaz | |
| 6,865,149 B1 | 3/2005 | Kalman et al. | |
| 6,941,222 B2 | 9/2005 | Yano et al. | |
| 6,944,139 B1 | 9/2005 | Campanella | |
| 6,950,625 B2 | 9/2005 | Regulinksi et al. | |
| 6,961,658 B2 | 11/2005 | Ohler | |
| 6,992,991 B2 | 1/2006 | Duske et al. | |
| 6,999,720 B2 | 2/2006 | Karabinis | |
| 7,013,205 B1 * | 3/2006 | Hafner | B60L 15/2045 |
| | | | 701/22 |
| 7,017,175 B2 | 3/2006 | Alao et al. | |
| 7,031,702 B2 | 4/2006 | Karabinis et al. | |
| 7,071,842 B1 | 7/2006 | Brady | |
| 7,082,365 B2 | 7/2006 | Sheha et al. | |
| 7,136,661 B2 | 11/2006 | Graske et al. | |
| 7,164,661 B2 | 1/2007 | Kelly | |
| 7,174,127 B2 | 2/2007 | Otten et al. | |
| 7,176,813 B2 | 2/2007 | Kawamata et al. | |
| 7,194,270 B2 | 3/2007 | Smith | |
| 7,224,935 B2 | 5/2007 | Messina et al. | |
| 7,233,860 B2 | 6/2007 | Lokshin et al. | |
| 7,239,963 B2 | 7/2007 | Suzuki | |
| 7,242,948 B2 | 7/2007 | Fleischer et al. | |
| 7,269,503 B2 | 9/2007 | McGrath | |
| 7,271,742 B2 | 9/2007 | Sheha et al. | |
| 7,274,905 B1 | 9/2007 | Nguyen et al. | |
| 7,274,906 B1 | 9/2007 | Nguyen et al. | |
| 7,286,931 B2 | 10/2007 | Kawasaki | |
| 7,289,039 B2 | 10/2007 | Kato et al. | |
| 7,321,826 B2 | 1/2008 | Sheha | |
| 7,412,313 B2 * | 8/2008 | Isaac | G01C 21/3679 |
| | | | 701/123 |
| 7,469,184 B2 * | 12/2008 | Isaac | G01C 21/3679 |
| | | | 701/300 |
| 7,490,004 B2 | 2/2009 | Kimura | |
| 7,577,576 B2 | 8/2009 | Baechtiger | |
| 7,599,770 B2 * | 10/2009 | Hardy | G01C 22/02 |
| | | | 340/438 |
| 7,609,700 B1 | 10/2009 | Ying | |
| 7,610,151 B2 | 10/2009 | Letchner et al. | |
| 7,623,859 B2 | 11/2009 | Karabinis | |
| 7,634,224 B2 | 12/2009 | Nguyen et al. | |
| 7,756,465 B2 | 7/2010 | Nguyen | |
| 7,765,055 B2 | 7/2010 | Cera et al. | |
| 7,778,591 B1 | 8/2010 | Van Hoff et al. | |
| 7,778,769 B2 * | 8/2010 | Boss | G06Q 10/047 |
| | | | 701/123 |
| 7,813,874 B2 | 10/2010 | Fujiwara | |
| 7,826,789 B2 | 11/2010 | Nord | |
| 7,908,076 B2 * | 3/2011 | Downs | G08G 1/0104 |
| | | | 701/117 |
| 8,060,389 B2 | 11/2011 | Johnson | |
| 8,099,086 B2 | 1/2012 | Singh et al. | |
| 8,457,682 B2 * | 6/2013 | Raab | H04M 1/72536 |
| | | | 455/550.1 |
| 9,276,664 B2 * | 3/2016 | Zufall | H04W 76/15 |
| 9,664,526 B2 * | 5/2017 | Raab | G01C 21/26 |
| 9,939,286 B2 * | 4/2018 | Raab | H04M 1/72536 |
| 2002/0065078 A1 | 5/2002 | Cohen et al. | |
| 2004/0022326 A1 | 2/2004 | Morrish et al. | |
| 2004/0110467 A1 | 6/2004 | Wang | |
| 2004/0128682 A1 | 7/2004 | Liga et al. | |
| 2004/0203919 A1 * | 10/2004 | Ross | H04L 67/18 |
| | | | 455/456.1 |
| 2004/0242152 A1 | 12/2004 | Jarett | |
| 2005/0055724 A1 | 3/2005 | Atad et al. | |
| 2005/0136832 A1 | 6/2005 | Spreizer | |
| 2005/0020737 A1 | 9/2005 | Schiff | |
| 2005/0239399 A1 | 10/2005 | Karabinis | |
| 2005/0239404 A1 | 10/2005 | Karabinis | |
| 2006/0023656 A1 | 2/2006 | Anglin | |
| 2006/0160219 A1 | 7/2006 | Lee et al. | |
| 2006/0190981 A1 | 8/2006 | Weill et al. | |
| 2006/0217885 A1 | 9/2006 | Crady et al. | |
| 2006/0229807 A1 * | 10/2006 | Sheha | G01C 21/3679 |
| | | | 701/468 |
| 2006/0229810 A1 | 10/2006 | Cross | |
| 2006/0253246 A1 | 11/2006 | Cera et al. | |
| 2007/0058083 A1 | 3/2007 | Kim | |
| 2007/0086460 A1 | 4/2007 | Choi et al. | |
| 2007/0087756 A1 | 4/2007 | Hoffberg | |
| 2007/0124789 A1 * | 5/2007 | Sachson | G06Q 30/00 |
| | | | 725/117 |
| 2007/0150174 A1 * | 6/2007 | Seymour | G01C 21/3617 |
| | | | 701/532 |
| 2007/0182592 A1 | 8/2007 | Lekovic | |
| 2007/0288162 A1 * | 12/2007 | Furukawa | G01C 21/367 |
| | | | 701/431 |
| 2008/0033639 A1 | 2/2008 | Nakamura et al. | |
| 2008/0071466 A1 * | 3/2008 | Downs | G08G 1/0104 |
| | | | 701/117 |
| 2008/0094250 A1 * | 4/2008 | Myr | G08G 1/04 |
| | | | 340/909 |
| 2008/0125958 A1 * | 5/2008 | Boss | G01C 21/3469 |
| | | | 701/123 |
| 2008/0134260 A1 | 6/2008 | Glassman et al. | |
| 2008/0200114 A1 | 8/2008 | Eberlein et al. | |
| 2008/0228562 A1 * | 9/2008 | Smith | G06Q 10/08 |
| | | | 705/13 |
| 2008/0248815 A1 * | 10/2008 | Busch | H04W 4/029 |
| | | | 455/456.5 |
| 2008/0268838 A1 * | 10/2008 | Zufall | H04W 76/15 |
| | | | 455/430 |
| 2008/0288406 A1 * | 11/2008 | Seguin | G06Q 30/02 |
| | | | 705/50 |
| 2008/0319642 A1 * | 12/2008 | DeBie | G01C 21/3492 |
| | | | 701/533 |
| 2080/0319642 | 12/2008 | Debie | |
| 2009/0007185 A1 | 1/2009 | Nix | |
| 2009/0028318 A1 * | 1/2009 | Bhogal | H04M 3/42263 |
| | | | 379/211.02 |

(56) References Cited

U.S. PATENT DOCUMENTS

| | | | | |
|---|---|---|---|---|
| 2009/0118996 | A1* | 5/2009 | Kantarjiev | G08G 1/0112 701/119 |
| 2009/0228196 | A1* | 9/2009 | Raab | G01C 21/26 701/532 |
| 2011/0202266 | A1* | 8/2011 | Downs | G08G 1/0104 701/119 |
| 2012/0065872 | A1 | 3/2012 | Nortrup | |
| 2012/0150425 | A1 | 6/2012 | Chapman et al. | |
| 2012/0205437 | A1 | 8/2012 | Sauerwein et al. | |
| 2012/0271541 | A1 | 10/2012 | Hjelm et al. | |
| 2013/0166208 | A1 | 6/2013 | Forstall | |
| 2016/0182168 | A1* | 6/2016 | Zufall | H04W 76/15 455/3.02 |
| 2016/0182169 | A1* | 6/2016 | Zufall | H04W 76/15 455/3.02 |

OTHER PUBLICATIONS

U.S. Appl. No. 15/046,091, Examiner's Answer, dated Apr. 5, 2018, 25 pages.
U.S. Appl. No. 15/055,856, Amendment & Response, dated Mar. 14, 2018, 12 pages.
U.S. Appl. No. 15/055,874, Corrected Non-Final Office Action, dated Mar. 7, 2018, 32 pages.
Segura, R., "COTS Satellite-Terrestrial Broadcast System for Deployed Communications, NATO Consultation, Command and Control Agency (NC3A), Communications and Information Systems Division", , p. 6.
U.S. Appl. No. 15/055,856, Notice of Allowance, dated Nov. 26, 2018, 10 pages.
U.S. Appl. No. 15/055,874, Notice of Appeal dated Dec. 19, 2018, 2 pages.
U.S. Appl. No. 15/590,167, Notice of Allowance, dated Nov. 9, 2018, 5 pages.
U.S. Appl. No. 15/590,167, Notice of Allowability, dated Dec. 19, 2018, 2 pages.
U.S. Appl. No. 15/055,856, filed Feb. 29, 2016.
U.S. Appl. No. 15/590,167, filed May 9, 2017.
U.S. Appl. No. 15/055,856, RCE and Amendment, dated Sep. 26, 2018, 13 pages.
U.S. Appl. No. 15/055,874, Final Office Action, dated Sep. 20, 2018, 31 pages.
U.S. Appl. No. 15/590,167, Amendment and Response, dated Sep. 10, 2018, 15 pages.
U.S. Appl. No. 15/046,091, Appellant's Reply Brief, dated Jun. 2, 2018, 9 pages.
U.S. Appl. No. 15/055,856, Final Office Action, dated Jun. 28, 2018, 19 pages.
U.S. Appl. No. 15/055,874, Response to Office Action, dated Jun. 2, 2018, 14 pages.
U.S. Appl. No. 15/590,167, Non-final Office Action, dated Jun. 14, 2018, 17 pages.
EP17155746.5, Examination Report, dated Jan. 25, 2019.
EP171557481.1, Exam Rpt, dated Jan. 25, 2019.
EP1755749.9, Exam Report, dated Jan. 28, 2019.
U.S. Appl. No. 15/055,874, Appeal Brief, dated Feb. 14, 2019.
U.S. Appl. No. 15/590,167, Notice of Allowability, dated Dec. 19, 2018.
U.S. Appl. No. 15/590,167, Notice of Allowability, dated Dec. 31, 2018.
U.S. Appl. No. 15/590,167, Notice of Allowability, dated Jan. 14, 2019.
U.S. Appl. No. 15/590,167, Notice of Allowability, dated Feb. 11, 2019.
U.S. Appl. No. 15/590,167, Notice of Allowability, dated Feb. 25, 2019.
U.S. Appl. No. 15/055,856, Notice of Allowability, dated Jan. 10, 2019.
U.S. Appl. No. 15/055,856, Notice of Allowability, dated Feb. 21, 2019.
U.S. Appl. No. 15/046,091, filed Feb. 17, 2016.
U.S. Appl. No. 15/055,874, filed Feb. 29, 2016.
U.S. Appl. No. 16/290,780, filed Mar. 2, 2019.
EP17155746.5, Response to Examination Report, dated May 28, 2019 (Received by WPIP on May 29, 2019).
EP171557481.1, Response to Exam Rpt, dated May 24, 2019.
EP1755749.9, Response to Exam Report, dated May 28, 2019 (Received by WPIP on May 28, 2019).
U.S. Appl. No. 15/055,856, Issue Notice, dated Apr. 3, 2019.
U.S. Appl. No. 15/055,874, Examiner's Answer, dated May 22, 2019.
U.S. Appl. No. 15/590,167, Notice of Allowability, dated Mar. 20, 2019.
U.S. Appl. No. 15/590,167, Issue Notice, dated Apr. 11, 2019.
U.S. Appl. No. 15/055,874, Reply Brief, dated Jul. 8, 2019.

* cited by examiner

METHOD AND SYSTEM FOR INTEGRATED SATELLITE ASSISTANCE SERVICES

CROSS-REFERENCE TO RELATED APPLICATIONS

This application is a continuation of U.S. patent application Ser. No. 14/321,559, filed on Jul. 1, 2014, which is a continuation of U.S. patent application Ser. No. 13/793,233, filed on Mar. 11, 2013 (now U.S. Pat. No. 8,805,435, issued on Aug. 12, 2014) which is a continuation of U.S. patent application Ser. No. 13/619,938, filed on Sep. 14, 2012 (now U.S. Pat. No. 8,626,231, issued on Jan. 7, 2014) which is a continuation of U.S. patent application Ser. No. 12/042,204, filed on Mar. 4, 2008 (now U.S. Pat. No. 8,457,682, issued on Jun. 4, 2013). This application is also a continuation of U.S. patent application Ser. No. 11/797,048, filed on Apr. 30, 2007. The above-identified U.S. patent applications and patents are hereby incorporated herein by reference in their entirety.

BACKGROUND

The invention relates generally to travel assistance and more particularly to devices providing interactive travel assistance services and methods for using such devices.

A hybrid satellite and terrestrial communication system, such as a Mobile Satellite Services (MSS) system with an Ancillary Terrestrial Component (ATC), for example, can provide a more efficient spectrum utilization and a more effective coverage in rural and urban areas than can be provided by stand-alone mobile satellite systems. For that reason, existing MSS/ATC systems have been typically used to provide voice communication with wide geographic coverage. Using existing MSS/ATC systems to make available other types of services, however, poses many implementation challenges. For instance, to support mobile interactive services, an MSS/ATC system design may need to effectively handle multicast transmissions across both satellite networks and ancillary terrestrial networks along with interactive communications with individual users. When properly designed, an MSS/ATC system can support one or more mobile interactive services, including travel assistance services, for example.

In a typical travel or roadside assistant service, a request is made from a vehicle to a service center through a cellular network. The service center can dispatch, automatically and/or through a live operator, for example, a service vehicle to where the person making the request is located. These types of services are limited, however, since user preferences are not generally part of the criteria used in the service center's selection of the service provider. For example, the service center may dispatch a service provider because it is the closest one to the requester, but it is one with whom the requester has had a bad experience in the past. In many instances restrictions in the scope of travel assistant services provided can result from the system and/or the network supporting those services.

Thus, a need exists for interactive services and/or devices that use satellite and terrestrial communication systems to offer users a wide geographic coverage along with a more flexible, effective, and/or feature-rich travel assistance experience.

A variety of entities provide and are preparing to provide Mobile Satellite Service ("MSS"), communications services utilizing one or more satellites. One important limitation of MSS service has been an inability to achieve suburban or urban penetration. While 2 Ghz MSS satellite communications provides effective coverage of rural and remote areas, coverage m suburban and urban areas is degraded by increased obscured satellite visibility.

Recognizing the value that the deployment and availability of MSS systems would bring by improving public safety, by providing voice, data, and messaging services to unserviced areas within the United States, and by increasing competition, the U.S. Federal Communications Commission ("FCC") issued orders permitting the use of an Ancillary Terrestrial Component ("ATC") to MSS systems to facilitate suburban and urban penetration.

MSS systems augmented with ATC ("MSS/ATC" systems) enable a wide variety of new communication services that will lead to the deployment and availability of commercially-viable interactive mobile satellite communications. By reusing at least a portion of frequencies between satellite and terrestrial communication systems, MSS/ATC systems offer more efficient spectrum utilization and effective coverage in both urban and rural areas. U.S. Pat. No. 6,950,625, which is hereby incorporated by reference in its entirety for all purposes, describes techniques for reusing frequencies between satellite and terrestrial systems. Additionally, U.S. Pat. No. 5,394,561 discloses a mechanism for networking satellite and terrestrial networks in which the power levels of the satellite and terrestrial communications are controlled to minimize co-channel interference.

Existing MSS and MSS/ATC systems typically provide satellite-based voice communications; however, it is possible, as described in this disclosure, to provide additional interactive communications. For example, U.S. Pat. No. 7,017,175 ("the '175 patent"), which is hereby incorporated by reference in its entirety for all purposes, describes techniques for providing interactive digital television. Using this interactive digital television system, viewers are provided with functionality not available in conventional television systems, such as, for example, the ability to receive targeted advertising, to request additional information related to a received multicast, to place an order for merchandise or services, to obtain information off of a network (e.g., the Internet), and the like.

There are many challenges in implementing an interactive communication system, such as that described by the '175 patent, in a hybrid satellite/terrestrial communication system. There is a need for an effective design to handle multicast transmissions across both satellite and ancillary terrestrial networks, as well as to handle interactive communications for individual users. Furthermore, network characteristics, such as latency, bandwidth, throughput, and the like, vary between satellite and terrestrial networks. Thus, there is a need for a hybrid communication system to effectively use both satellite and terrestrial networks to provide effective coverage to both urban and rural subscribers.

SUMMARY

An apparatus may include a controller to process a travel assistance request for communication through a satellite and terrestrial mobile communication network. Data related to multiple assistance providers can be received in response to the request. At least one criterion can be processed for the service assistance based on, for example, historical trip data. The assistance providers can be graphically represented for user selection based on the criterion. Data related to a selected assistance provider can be displayed, including navigation data to and/or from the assistance provider. In another embodiment, the travel assistance request can be communicated to a service center through the network. The service center can communicate data related to an assistance provider, including navigation data between the assistance provider and the user making the request. A rating of the assistance provider can be communicated to a specified community-of-interest through the network.

In one general aspect, a system for providing mobile interactive satellite services includes a satellite operable to communicate with mobile units, a terrestrial base transceiver station operable to communicate with mobile units, and a ground station in communication with the satellite and the terrestrial base transceiver station to provide mobile interactive satellite services. The mobile interactive satellite services include a multicast component and an interactive component such that the ground station provides both the multicast component and the interactive component using the satellite, with the terrestrial base transceiver station used to provide an ancillary terrestrial component. The satellite may be placed in any orbit (e.g., a geostationary orbit, a low earth orbit, a medium earth orbit, a circular orbit, and the like) such that at least one satellite is operable to communicate with mobile units at a given time.

Furthermore, some implementations may provide multiple satellites, multiple terrestrial base transceiver stations, and/or multiple ground stations for various reasons, including, for example, redundancy, increased capacity, geographical coverage, reduced latency, improved performance, and the like. Additional satellites and/or terrestrial base transceiver stations may be used to transmit and/or receive information related to the multicast component and/or interactive component of the system.

In some implementations, multiple satellites are used. Additional satellites may be used to expand overall system capacity, to facilitate communication with terrestrial base transceiver stations, to expand service areas, etc. For example, in one implementation, the secondary satellite communicates information related to the multicast component of the mobile interactive satellite services between the terrestrial base transceiver station and the ground station.

The ground station may be implemented using a multicast core, an interactive core, and a communication unit coupled to the multicast core and the interactive core, such that the ground station may communicate with satellite to provide multicast and interactive communications to mobile units. The communication unit may be implemented using a radio-frequency communication unit to transmit and/or receive radio-frequency signals between the ground station and the satellite.

Some implementations use advanced antenna technology at the ground station and/or at the satellite to provide added benefits, such as increased capacity, reduced interference, increased link budget, beamforming, and the like. In one implementation, the communication unit includes a ground-based beamforming unit and a radio-frequency communication unit. The ground-based beamforming unit receives interactive and multicast communications information and performs digital signal processing. Then, the radio-frequency communications unit transmits one or more signals to the satellite such that the satellite may transmit the multicast and/or interactive information using beamforming. Any other advanced antenna technologies may be used, such as, for example, MIMO, various diversity techniques, beamforming, and the like.

Mobile interactive satellite services may include one or more of multicast audio, multicast video, multicast data, interactive audio, interactive video, interactive data, telephony, or the like.

In another general aspect, a device for communicating with a mobile interactive satellite service system includes an antenna, a transceiver coupled to the antenna and operable to communicate with a mobile interactive satellite service system, an input device, an output device, a processor unit (e.g., a general-purpose processor, an application-specific integrated circuit, a digital signal processor, and the like), and a network interface. The processor unit is coupled to the input device, the output device, and the transceiver such that the processor is operable to output received information from the transceiver using the output device, to receive interactive information from the input device, and to transmit data based on the received interactive information using the transceiver. The network interface is coupled to the processor such that the processor is operable to side load information.

The antenna may be implemented using any known antenna technology. For example, multiple elements may be used, such as in an antenna array, and digital signal processing techniques may be used to provide improved performance. The mobile interactive satellite service system may include both a terrestrial component and a satellite component. The same antenna(s) may be used for both components, or separate antennas may be employed. For example, it may be desirable to employ an omni-directional antenna for communication with terrestrial components while using a directional antenna for satellite communication. Alternatively, it may be desirable to use an antenna having at least two elements: a terrestrial element having linear polarization, and a satellite element having circular polarization.

The device may include any input and output devices. For example, the input device may be implemented using a mouse, a touch screen, a keyboard, a button, a microphone, a video camera, a joystick, a port, a remote control, and the like. The output device may be implemented using any display device (e.g., a cathode ray tube, a liquid crystal display panel, a projection screen, a plasma display, etc.), a speaker, a light, a port (e.g., a serial port, a network port, a date interface, etc.), and the like. The microphone may be used with a voice recognition unit to enable, for example, voice control, voice commands, and the like.

Some implementations include a side-loading network interface wherein the processor unit is coupled to the side-loading network interface such that the processor unit can receive information from the transceiver and from the side-loading network interface. The network interface may be implemented using any data networking technology including, for example, an IEEE 802.11 WiFi interface, an IEEE 802.16 WiMAX interface, a Bluetooth interface, an IEEE 802.20 interface, or the like.

Furthermore, a device for interacting with a mobile interactive satellite service system may be integrated with a vehicle (e.g., car, truck, bus, airplane, ship, and the like), by providing an interface to one or more vehicle subsystems as input and/or output devices. For example, the device may be integrated with a video entertainment system, an audio entertainment system, a navigation system, a vehicle data bus system, or the like. When a vehicle subsystem is provided as an output device, the device may be configured to receive information and use the received information to update one or more of the vehicle subsystems. One skilled in the art will understand that this configuration enables a wide-variety of applications. The device may be interfaced with a vehicle communication bus interface, such as, for example, CAN, OBDII, and/or MOST.

In another general aspect, a satellite for providing mobile interactive satellite services includes a ground station uplink that receives multicast content and interactive content from a ground station, mobile unit downlink that transmits multicast content and interactive content to mobile units, a mobile unit uplink that receives interactive content from the mobile units, a ground station downlink that transmits interactive content to the ground station, and a processor unit. The processing unit is coupled to the ground station uplink, the mobile unit downlink, the mobile unit uplink, and the ground station downlink, and configured to provide mobile interactive satellite services to the mobile units. In some implementations, the ground station uplink, the mobile unit downlink, the mobile unit uplink, and the ground station downlink operate in conjunction with an ancillary terrestrial communication system.

In this implementation, mobile interactive satellite services may include any interactive and/or multicast services, such as, for example, vehicle navigation, multicast video, interactive video, interactive data communication, vehicle telemetry, vehicle subsystem control, vehicle subsystem maintenance, vehicle security services, or the like. The satellite may use any advanced antenna technology, including beamforming.

In another general aspect, a ground station for providing mobile interactive satellite services includes a multicast core, an interactive core, and a radio frequency communication unit coupled to the multicast core and the interactive core such that the radio frequency communications unit is operable to communicate with the satellite to provide multicast and interactive communications to mobile units. The radio frequency communication unit may use any advanced antenna technology, such as, for example, beamforming or MIMO.

In another general aspect, a terrestrial base transceiver station for providing ancillary terrestrial communications in a mobile interactive satellite service includes a ground station communication link for communicating multicast and interactive content with a ground station, a mobile unit downlink that transmits multicast content and interactive content to mobile units, a mobile unit uplink that receives interactive content from the mobile units, and a processor unit. The processor unit is coupled to the ground station communication link, the mobile unit downlink, and the mobile unit uplink, and configured to provide ancillary terrestrial communications in a mobile interactive satellite service.

In another general aspect, a method for providing mobile interactive satellite services on a satellite includes receiving multicast data for transmission to mobile units, receiving interactive data for transmission to mobile units, and transmitting multicast data and interactive data to mobile units. Multicast data for transmission to mobile units may be received from any source, such as, for example, a ground station, a terrestrial base transceiver station, a satellite, or the like. Interactive data may be received from and/or transmitted to mobile units, ground stations, other satellites, or the like.

Data may be transmitted by a satellite and/or terrestrial base transceiver station using advanced antenna technology, such as, MIMO or beamforming. For example, advanced antenna technology can be used to form multiple beams configured to cover a geographical area.

In some implementations, transmitting multicast data and interactive data to mobile units includes transmitting multicast data over a first portion of available radio frequency spectrum, and transmitting interactive data over a second portion of available radio frequency spectrum. These portions of radio frequency spectrum may be configurable (either automatically, manually, and/or dynamically).

In another general aspect, a method for providing ground station support in a mobile interactive satellite service includes transmitting multicast data such that the multicast data may be communicated to mobile units, receiving interactive mobile unit data, processing the received interactive mobile unit data to determine interactive data to be communicated to at least one of the mobile units, and transmitting the determined interactive data such that the determined interactive data may be communicated to the at least one of the mobile units.

In some implementations, the method further includes receiving multicast data from a multicast data feed, such as, from a satellite feed, a terrestrial feed, or the like. Similarly, interactive mobile unit data may be received through a satellite, a terrestrial base transceiver station, or the like. This interactive mobile unit data may be obtained from a server, such as, for example, an application server, which may reside locally, on an internal communications network, and/or on an external communications network. Received interactive mobile unit data may be processed by retrieving data in response to the received interactive mobile unit data and assembling the retrieved data for transmission. Once interactive data has been processed, the data may then be transmitted to one or more mobile units via satellite or terrestrial base transceiver station.

In another general aspect, a method for providing ancillary terrestrial communication in a mobile interactive satellite system includes augmenting a mobile interactive satellite system having a multicast component and an interactive component with a terrestrial base transceiver station, transmitting information for the multicast component and the interactive component using a satellite, and transmitting information for the multicast component and the interactive component using the terrestrial base transceiver station. The method may further include receiving information for the interactive component using the satellite and/or the terrestrial base transceiver station.

In another general aspect, a method for providing mobile interactive satellite services includes receiving multicast data for transmission using a communication system that includes a satellite with an ancillary terrestrial component, receiving interactive data using the communication system, determining interactive data for transmission using the received interactive data, and transmitting the multicast data and the determined interactive data using the communication system to provide mobile interactive satellite services. Multicast data may include, for example, broadcast video feeds, broadcast audio feeds, data feeds, or the like. Interactive data may be received from a mobile unit through a satellite and/or terrestrial communications link (e.g., through an ancillary terrestrial component of a mobile interactive satellite service). This terrestrial communications link may be implemented using a terrestrial base transceiver station. Multicast and/or interactive data may be transmitted using both a satellite and an ancillary terrestrial component. When interactive data is received from a mobile unit, the system determines a response, for example, by retrieving information based on the received interactive data.

Some implementations provide mobile interactive satellite services for vehicles, such as, for example, vehicle navigation, vehicle entertainment services, vehicle security services, and the like. By integrating a mobile unit with various vehicle subsystems, a mobile interactive satellite service system may be used to transmit information to update a variety of systems by providing software updates, configuration updates, firmware updates, and the like.

Vehicle security services may be provided to retrieve and provide vehicle security information, such as, for example, vehicle telemetry, vehicle location, vehicle security incidents, telephonic information, vehicle system information, and the like. Mobile interactive satellite services may provide vehicle-based services such as, remote vehicle tracking, remote vehicle disabling, remote vehicle enabling, remote vehicle unlocking, remote vehicle monitoring, vehicle black box access, vehicle black box recording, and the like.

In another general aspect, a method for interacting with a mobile interactive satellite service with an ancillary terrestrial component in a vehicle includes receiving information from a vehicle communication bus, and transmitting data to a mobile interactive satellite service system with an ancillary terrestrial component based on the received information. The vehicle communication bus may be used to obtain various notifications such as, for example, air bag deployment notification, vehicle speed information, vehicle position information, error messages, temperature indications, fuel level indications, and the like. The system may include receiving a request from the mobile interactive satellite system to perform an action on a vehicle system and perform the requested action.

In some implementations, the system receives notifications directly through a vehicle communication database; however, in some implementations, the system periodically polls one or more vehicle systems (possibly using the vehicle communication database) to determine if an event has occurred. This system may be used to upgrade software, firmware, modify configurations, monitor systems, and the like, through a satellite-based communications system. This system may be used to retrieve and possibly output video, audio, data, and the like, using any output device, including a display, a speaker, a light, or the like.

The details of one or more implementations are set forth in the accompanying drawings and the description below. Other features and advantages will be apparent from the description and drawings, and from the claims.

DETAILED DESCRIPTION

Figure 1:
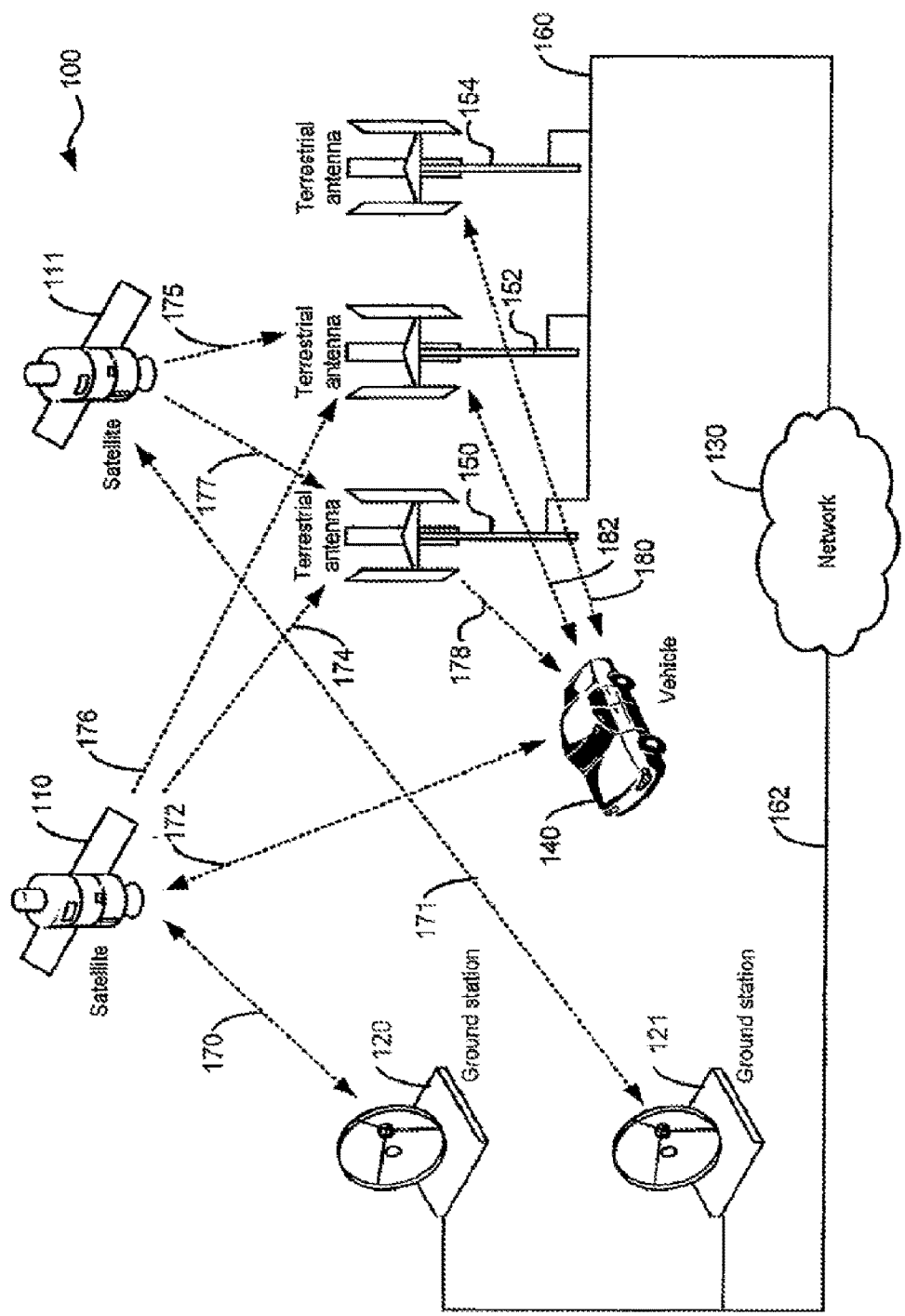
FIG. 1 is a schematic representation of a satellite and terrestrial mobile communication network, according to an embodiment of the invention.

The devices and methods described herein are generally related to mobile or in-vehicle interactive navigation services. For example, the devices and methods are suitable for use in a hybrid satellite and terrestrial (satellite/terrestrial) communication system, such as a Mobile Satellite Services (MSS) system with an Ancillary Terrestrial Component (ATC). An example of such a hybrid satellite/terrestrial communication system is described in U.S. patent application Ser. No. 11/797,048 to Zufall et, al., the disclosure of which is incorporated herein by reference in its entirety. An MSS MSS/ATC system can use one or more satellites to support a wide geographic coverage of mobile satellite interactive services. For example, a portion of the 2 GHz spectrum allocated for MSS satellite communications can be used to provide effective service coverage to rural and remote areas. Along with the MSS network, the land-based ATC network can facilitate service penetration in urban and suburban areas through effective satellite and terrestrial frequency reuse.

The mobile interactive satellite services described herein can be used to provide interactive travel assistance services. A user can request travel assistance (e.g., vehicle repair assistance, medical care assistance, travel guidance assistance) through a mobile interactive services system. In one embodiment, data related to multiple assistance service providers (e.g., gas stations, auto repair shops, police stations, medical centers, clinics, hospitals) for a specified assistance category (e.g., auto repair providers, medical care providers, public safety providers) can be received in response to the request via a hybrid satellite/terrestrial communication network. At least one criterion can be processed for the assistance providers based on, for example, historical trip data. In some instances, data related to each of the assistance providers can be graphically represented based on the criterion to assist the user in the selection process. Navigation data and/or other information to and/or from the selected assistance provider can be displayed to assist the user getting appropriate assistance.

In another embodiment, the travel assistance request can be communicated to a service center through the hybrid satellite/terrestrial communication network. The service center can communicate data related to a specified assistance provider, including navigation data to and/or from the assistance provider and/or information related to a service vehicle dispatched by the assistance provider. In some instances, the user can provide ratings and/or reviews of the assistance provider that can be shared with a specified community-of-interest (COI) through the hybrid satellite/terrestrial communication network.

It is noted that, as used in this written description and the appended claims, the singular forms "a," "an" and "the" include plural referents unless the context clearly dictates otherwise. Thus, for example, the term "a route segment" is intended to mean a single segment or a combination of segments. Similarly, the term "a destination area" is intended to mean, for example, a single destination area or more than one destination areas.

FIG. 1 depicts a schematic representation of a satellite and terrestrial mobile communication network, according to an embodiment of the invention. A hybrid satellite/terrestrial communication network 100 can be configured to provide mobile interactive satellite services, such as interactive travel assistance services, for example. The hybrid satellite/terrestrial communication network 100 can include a first satellite 110, terrestrial antennas 150, 152, and/or 154, a first ground station 120, and a network 130. In some instances, the hybrid satellite/terrestrial communication network 100 can have a second satellite 111 and/or a second ground station 121 to support other mobile interactive satellite services, such as mobile video services that provide satellite television multicasting, for example.

The first satellite 110 can be configured to communicate with the first ground station 120 through one or more signals in a connection or communication path 170 that includes, for example, uplink signals and downlink signals. The uplink signals can be used to communicate information or data from the first ground station 120 to the first satellite 110. The uplink-communicated information can include a multicast portion or component (e.g., video, music, traffic reports, radio) and/or an interactive component (e.g., navigation data, travel assistance data). The downlink signals can be used to communicate data, such as interactive data (e.g., requests for navigation services, requests for travel assistance services), from the first satellite 110 to the first ground station 120.

The first ground station 120 can be configured to process at least a portion of the data or information related to an interactive service that can be supported by the hybrid satellite/terrestrial communication network 100. In this regard, the first ground station 120 can be configured to process multicast, interactive, and/or control data for communication with the first satellite 110. In one example, the first ground station 120 can generate ground-based beam-forming (GBBF) information that is communicated to the first satellite 110 via the communication path 170. The GBBF information can be used to configure a transmission antenna, such as an antenna array, for example, which can be used by the first satellite 110 to generate an appropriate number of beam spots and beam spot locations, and/or appropriate beam spot shapes to effectively communicate with a mobile interactive services system, such as one that can be used in the vehicle 140, and/or with terrestrial antennas 150 and 152. The GBBF information can be dynamically modified to adjust communication operations, including spectrum bandwidth and/or geographic coverage, for example, between the first satellite 110 and users of mobile interactive satellite services. In emergency situations, such as during a natural disaster, for example, GBBF information can be processed in a manner such that priority in spectrum bandwidth and/or geographic coverage can be given to affected areas.

The first satellite 110 can be configured to communicate with a mobile interactive services system through one or more signals in a connection or communication path 172. In the example shown in FIG. 1, the first satellite 110 can communicate with a mobile interactive services system in the vehicle 140. The communication path 172 can include a downlink signals through which the first satellite 110 can wirelessly transmit multicast and/or interactive data to the mobile interactive services system and an uplink signals to wirelessly transmit interactive data from the mobile interactive services system in the vehicle 140 to the first satellite 110. In this regard, a user can request data, such as travel assistance data, data related to a specific destination, and/or data related to a destination or assistance category of interest, for example, through one or more mobile interactive satellite services supported though the uplink signals in the communication path 172. Moreover, a mobile interactive services system can communicate with a service provider (e.g., navigation service provider, travel assistance service provider, a travel assistance service center) through the downlink and uplink signals in the communication path 172.

In some embodiments, the first satellite 110 can be configured to communicate with terrestrial antennas 150 and 152 using one or more signals through communication paths 174 and 176, respectively. For instance, communication paths 174 and 176 can each include a downlink path from the first satellite 110 to the terrestrial antennas 150 and 152, respectively. Each of the downlink paths can support multicast and/or interactive data communication to the terrestrial antenna. In one example, the terrestrial antenna 150 can be configured to further communicate multicast and/or interactive data received from the first satellite 110 to a mobile interactive services system in the vehicle 140 through a downlink path in a communication path 178. In the example shown in FIG. 1, however, terrestrial antenna 150 may not be configured to receive interactive data from the mobile interactive services system in the vehicle 140 (e.g., communication path 178 may not support uplink signals to terrestrial antenna 150). In another example, terrestrial antenna 152 can be configured to further communicate multicast and/or interactive data received from the first satellite 110 to a mobile interactive services system in the vehicle 140 through a downlink path in a communication path 182. Along with the downlink path, communication path 182 can have an uplink path that can support transmission of signals that include interactive data from the mobile interactive services system in the vehicle 140 to the terrestrial antenna 152.

The ground station 120 can be configured to communicate with terrestrial antennas 150, 152, and 154 through a network 130. In this regard, land-based communication of multicast and/or interactive data can occur through terrestrial antennas 150, 152, and 154. In the example shown in FIG. 1, terrestrial antennas 150, 152, and 154 can be configured to communicate multicast and/or interactive data via at least one of communication paths 178, 182, and 180, respectively, with a mobile interactive services system in the vehicle 140. Terrestrial antennas 152 and 154, for example, can be configured for bi-directional communication and can receive interactive data from the mobile interactive services system in the vehicle 140 through uplink paths in communication paths 182 and 180, respectively. Terrestrial antennas 152 and 154 can be configured to communicate interactive data received from the mobile interactive services system in the vehicle 140 to the ground station 120 through the network 130 for processing.

The network 130 can include at least a portion of, for example, a public switched telephone network (PSTN), a packet-switched network, a satellite network, and/or a wireless network. The packet-switched network can be a multiprotocol label switching (MPLS) network that can carry different kinds of traffic such as Internet protocol (IP) packets, asynchronous transfer mode (ATM) frames, synchronous optical network (SONET) frames, and/or Ethernet frames, for example. The ground station 120 can be configured to communicate with the network 130 through a network connection or communication path 162. Terrestrial antennas 150, 152, and 154 can communicate with the network 130 through a network connection or communication path 160. Communication paths 160 and 162 can include, in some instances, a broadband and/or long-haul optical fiber connection.

Other embodiments of the hybrid satellite/terrestrial communication network 100 can include a number of ground stations, terrestrial antennas, and/or satellites that can be different from those of the different embodiments described in FIG. 1. Moreover, other embodiments of the hybrid satellite/terrestrial communication network 100 can support multiple devices that like the mobile interactive services system in the vehicle 140 can be configured to communicate with the first satellite 110 and with the terrestrial antennas 150, 152, and/or 154. For example, handheld devices, laptops, and/or in-vehicle systems can be configured to receive and/or transmit data related to mobile interactive satellite services through an embodiment of the hybrid satellite/terrestrial communication network 100.

Figure 2:
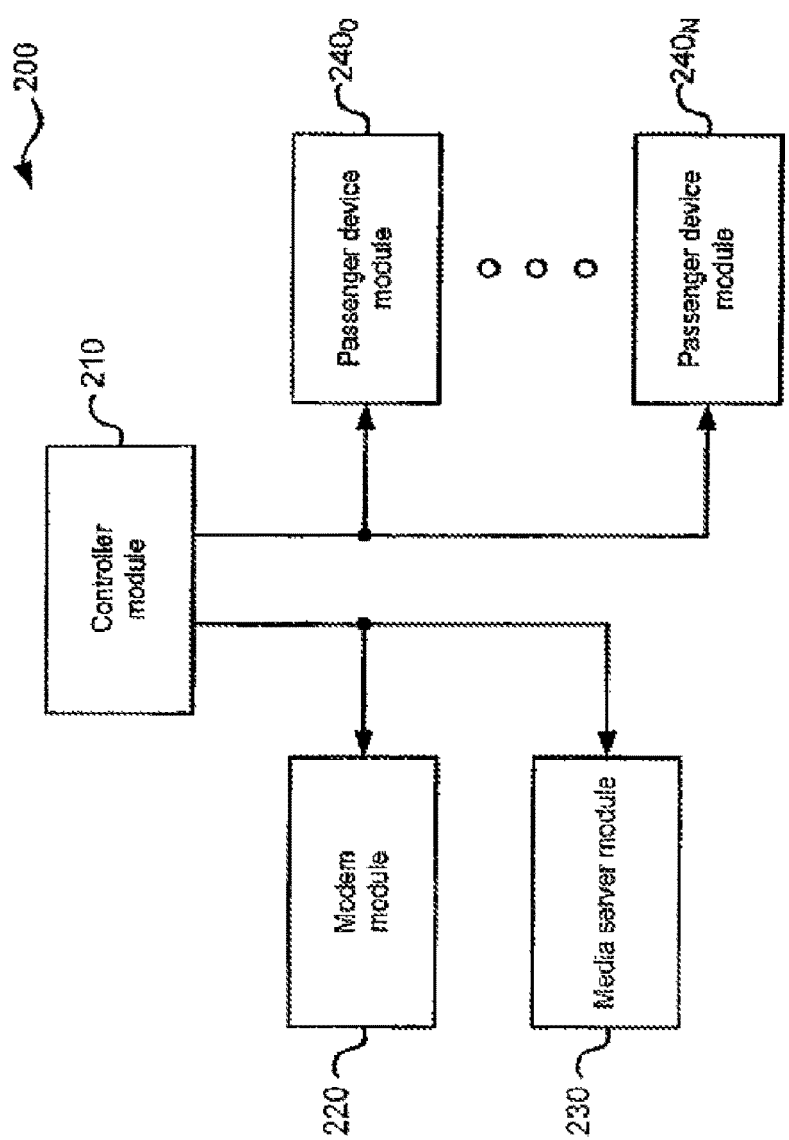
FIGS. 2-3 are block diagrams of a mobile interactive services system for satellite and terrestrial communication, according to embodiments of the invention.
Figure 3:
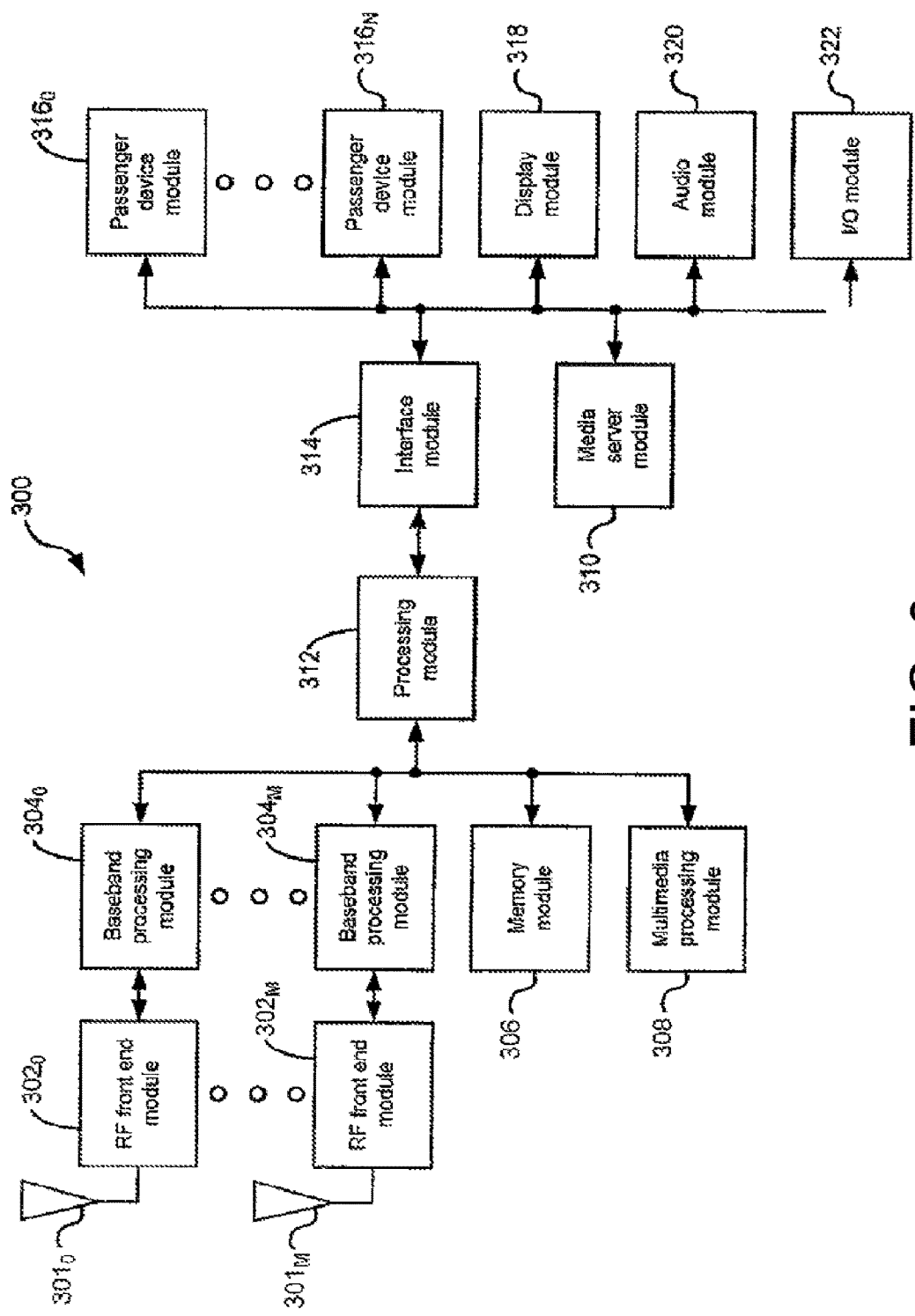

FIGS. 2-3 are block diagrams of a mobile interactive services system for satellite and terrestrial communication, according to embodiments of the invention. FIG. 2 depicts a schematic representation of a mobile interactive services system 200 that can be configured to provide mobile interactive satellite services. In some instances, the mobile interactive services system 200 can be an in-vehicle system (i.e., can operate within and/or coupled to a vehicle, for example). The mobile interactive services system 200 can include a controller module 210, a modem module 220, and/or a media server module 230. In some instances, the mobile interactive services system 200 can include one or more passenger device modules $240_0$-$240_N$. The controller module 210, the modem module 220, the media server module 230, and the passenger device modules $240_0$-$240_N$ can be software-based (e.g., set of instructions executable at a processor, software code) and/or hardware-based (e.g., circuit system, processor, application-specific integrated circuit (ASIC), field programmable gate array (FPGA)). In some embodiments, the mobile interactive services system 200 can be configured to communicate with a vehicle communication network, such as, for example, a controller area network (CAN), an on-board diagnostics II (OBD-11), a media-oriented system transport (MOST), or other like vehicle communication networks.

The controller module 210 can be configured to process and/or display data such as data received from other modules or components of the mobile interactive services system 200, data that is provided as input from a user, and/or data received from a vehicle communication network or bus. For instance, the controller module 210 can receive, process, and/or display multicast and/or interactive data that is received via the modem module 220. In some instances, the controller module 210 can receive, process, and/or display data (e.g., video, audio, navigation, and/or travel assistance data) stored in the media server module 230. The data processing provided by the controller module 210 can include processing that supports mobile interactive satellite services such as mobile interactive travel assistance services, for example. The controller module 210 can be configured to store data before, during, and/or after processing.

In some embodiments, the controller module 210 can be configured to collect and/or process historical trip data from one or more previous trips. In other embodiments, the controller module 210 can process historical trip data for transmission to a service provider or service center that may further process the historical trip data to generate, for example, navigation and/or travel assistance data. The travel assistance data generated from the processed historical trip data can be subsequently received by the mobile interactive services system 200. Historical trip data can include, for example, departure time and/or location, arrival time and/or location, road or route segments traveled, travel time, travel distance, time of departure, and/or date (day, week, month, and/or year) of travel. In some embodiments, historical trip data can include navigation data or guidance data that may have been received from a navigation service provider for consideration by a user during a previously occurring trip.

An example of historical trip data processing can include determining which trips are routine or regularly occurring trips. In one embodiment, routinely occurring trips can be determined by generating statistical information which may be compared to specified thresholds to determine when a certain trip (e.g., weekday morning commute to work) occurs routinely. A road or route segment traveled during a routine trip can be referred to as a routine route segment and a destination location or destination area arrived to during a routine trip can be referred to as a routine destination location or a routine destination area, respectively, for example. In other embodiments, a user of the mobile interactive services system 200 may indicate to the system that a trip is a routine trip.

The controller module 210 can be configured to communicate data to other components of the mobile interactive services system 200. For example, the controller module 210 can communicate user input data, such as interactive data, to the modem module 220. Moreover, the controller module 210 can be configured to control at least a portion of the operation of other components of the mobile interactive services system 200. The controller module 210 can control, for example, the providing of video, audio, and/or other data to the passenger device modules $240_0$-$240_N$.

The modem module 220 can be configured to communicate with a network such as the hybrid satellite/terrestrial communication network 100 described in FIG. 1. In this regard, the modem module 220 can support multiple wireless and/or satellite communication or networking protocols, including multiple cellular communication protocols, for example. For mobile video services, for example, the modem module 220 can support one or more satellite communication protocols, such as digital video broadcasting satellite services to handhelds (DVB-SH) or DVB second generation (DVB-S2). The modem module 220 can communicate with cellular networks such as global system for mobile communications (GSM) or code-division multiple access (CDMA) networks, for example. Moreover, the modem module 220 can be configured to support wireless side-loading operations, such as content loading from a local area network (LAN), through multiple wireless interfaces, including WiMax IEEE 802.16 interface and/or WiFi IEEE 802.11 interface, for example.

The media server module 230 can be configured to store multimedia data (e.g., video, audio, navigation, and/or travel assistance data). The multimedia data can be stored in, for example, integrated circuit (IC) memory, compact discs (CDs), digital video discs (DVDs), and other like machine-readable storage medium. In some instances, the media server module 230 can receive multimedia data for storage from the modem module 220. In this regard, the media server module 230 can operate as a digital video recorder (DVR), for example. In a DVR, multimedia data (e.g., current satellite video channel programming) can be received and stored while stored multimedia data (e.g., previously stored satellite video channel programming) can be accessed for further processing. The media server module 230 can communicate stored multimedia data to the controller module 210, which may process and/or display the multimedia data. For instance, the controller module 210 can display video data, audio data, instructional information, travel assistance information, navigation maps, guidance information, travel directions, information related to specified destinations and/or destinations within destination or assistance categories, personal and/or community ratings of places, and/or other information that may be stored in the media server module 230. Moreover, the controller module 210 may communicate at least a portion of the multimedia data received from the media server module 230 to one or more of the passenger device modules $240_0$-$240_N$ for display.

The passenger device modules $240_0$-$240_N$ can be configured to process and/or display data received from the controller module 210. For example, the passenger device modules $240_0$-$240_N$ can be configured to play movies, music, radio programming, video games, and/or other applications. The controller module 210 can be used to select which application is provided in each of the passenger device modules. In this regard, the passenger device modules $240_0$-$240_N$ can be configured such that each can provide the same application (e.g., multiple users can play a single video game) or different applications (e.g., different movies in each module).

Other embodiments of the mobile interactive services system 200 can include architectural organizations, such as data and/or control bus architectures, for example, different from those of the different embodiments described in FIG. 2. In other embodiments, more than one of the modules described in FIG. 2 can be combined into a single module. One or more of the functionalities or operations provided by different modules described in FIG. 2 can be shared between different modules and/or can be combined such that a single module provides the functionality or operation. Other embodiments of the mobile interactive services system 300 can include one or more modules that can support additional mobile interactive satellite services.

FIG. 3 depicts a schematic representation of a mobile interactive services system 300 that can be configured to provide mobile interactive satellite services such as mobile interactive navigation services and/or mobile interactive travel assistance services, for example. The mobile interactive services system 300 can include one or more radio frequency (RF) front-end modules $302_0$-$302_M$, one or more baseband processing modules $304_0$-$304_M$, a memory module 306, a multimedia processing module 308, a processing module 312, an interface module 314, a media server module 310, a display module 318, an audio module 320, and/or an input/output (ITO) module 322. In some embodiments, the mobile interactive services system 300 can include one or more passenger device modules $316_0$-$316_M$. The media server module 310 and the passenger device modules $316_0$-$316_M$ in FIG. 3 can have, respectively, substantially similar functionality as that of the media server module 230 and of the passenger device modules $240_0$-$240_N$ described in FIG. 2.

The RF front-end modules $302_0$-$302_M$ can be coupled to one or more antennas, such as the antennas $301_0$-$301_M$, for example, for transmission and/or reception of RF signals. The mobile interactive services system 300 can communicate with a hybrid satellite/terrestrial communication network through the RF front-end modules $302_0$-$302_M$ via the antennas $301_1$-$301_M$. Each of the antennas $301_0$-$301_M$ can be a single antenna or multiple antennas, such as antenna arrays, for example. In some instances, the mobile interactive services system 300 can support multiple-input multiple-output (MIMO) operations, and other like operations that use antenna diversity or smart antenna technology.

The modules or components of the mobile interactive services system 300 can be software-based (e.g., set of instructions executable at a processor, software code) and/or hardware-based (e.g., circuit system, processor, application-specific integrated circuit (ASIC), field programmable gate array (FPGA)). The RF front-end modules $302_0$-$302_M$, for example, can be configured to process RF signals. In this regard, an RF front-end module can operate as a transmitter (i.e., processes signals for wireless transmission) and/or as a receiver (i.e., processes wirelessly-received signals). An RF front-end module can be configured to perform multiple signal processing operations, including, but not limited to, amplification, filtering, analog-to-digital conversion (ADC), de-modulation, modulation, digital-to-analog conversion (DAC), and/or mixing, for example. Thus, an RF front-end module can convert received RF signals to an appropriate baseband frequency for further processing and/or convert baseband frequency signals to appropriate RF signals for wireless transmission. An RF front-end module can process signals according to one or more terrestrial (e.g., land-based) and/or satellite RF communication protocols.

The baseband processing modules $304_0$-$304_M$ can be configured to perform digital signal processing operations on data received from an RF front-end module, from the processing module 312, and/or from the memory module 306, for example. A baseband processing module can communicate processed data to an RF front-end module for wireless transmission or to another module of the mobile interactive services system 300 for further processing. In one example, video content from a video interactive service can be received and processed by a baseband processing module and can be communicated to the multimedia processing module 308 for further processing. In another example, travel assistance or assistance-related data can be received and processed by a baseband processing module and can be communicated to the processing module 312 for further processing and/or to the memory module 306 for storage. A baseband processing module can process data according to one or more terrestrial and/or satellite RF communication protocols. Moreover, a baseband processing module can provide feedback information to an RF front-end module based on information that results from processing data.

The memory module 306 can include a machine-readable storage medium, such as an IC memory, for example, that can be configured to store data used by the mobile interactive services system 300. In some instances, the stored data can include data related to one or more mobile interactive satellite services such as navigation services and/or travel assistance services. For example, the memory module 306 can store travel assistance and/or assistance-related data that can include, without limitation, historical trip data, current trip data, navigation data provided by a service provider that is related to a previously conducted trip, navigation data related to a assistance service provider, and/or data related to multiple assistance service providers for a specified assistance category. The memory module 306 can be configured to store other types of data including, without limitation, data related to terrestrial and/or satellite communication protocols, data related to terrestrial and/or satellite communication activity, video data, audio data, and/or application data. The memory module 306 can store data received from and/or to be communicated to a hybrid satellite/terrestrial communication network through the RF front-end modules $300_0$-$302_M$.

The multimedia processing module 308 can be configured to digitally process multimedia data (e.g., video, audio, and/or content data). For example, video data can be decoded and/or encoded at the multimedia processing module 308 according to the appropriate video coding standard. In this regard, the multimedia processing module 308 can be configured to support more than one video, audio, and/or content data coding standard, such as the H.264 standard and/or the MPEG-4 standard for video coding, for example. In some instances, the processing module 312 can provide at least a portion of the multimedia data processing operations supported by the mobile interactive services system 300. For example, the multimedia processing module 308 can be optimized for video data processing operations and the processing module 312 can be used to provide audio and/or content data processing operations.

The processing module 312 can be configured to provide operations for mobile interactive satellite services, including mobile interactive navigation services and/or mobile interactive travel assistance services. For example, along with providing control operations for the mobile interactive services system 300, the processing module 312 can provide mobile interactive navigation services operations that include, but are not limited to, operations related to the processing, storing, displaying, organizing, selecting, and/or inputting of user data. In this regard, the processing module 312 can receive data from a hybrid satellite/terrestrial communication network through the RF front-end modules $302_0$-$302_M$ and the baseband processing modules $304_0$-$304_M$. Moreover, the processing module 312 can receive data from the memory module 306, the multimedia processing module 308, the display module 318, media server module 310, the audio module 320, the I/O module 322, and/or the passenger device modules $316_0$-$316_N$.

The interface module 314 can be configured to communicate data between multiple modules and the processing module 312. In some embodiments, the interface module 314 can support multiple interface busses, protocols, and/or standards, such as the inter-integrated circuit ($I^2C$) bus, the integrated inter-chip sound (FS) bus, the serial-peripheral interface (SPI) bus, and/or the universal serial bus (USB), for example. In this regard, the interface module 314 can use different bus protocols to communicate, for example, audio, video, content, and/or graphical data between the processing module 312 and one or more modules. For example, in mobile interactive travel assistance services, a controller module, such as the controller 210 in FIG. 2, can include the display module 318, the audio module 320, and/or the I/O module 322 for providing a user interface (UI) to receive and/or provide travel assistance data. In this example, the display module 318 can communicate with the interface module 314 through one interface protocol and the audio module 320 through a different interface protocol. Moreover, the I/O module 322 can communicate user selection data, such as touch-screen data input or button data input, for example, using yet a different interface protocol.

Other embodiments of the mobile interactive services system 300 can include architectural organizations, such as data and/or control bus architectures, for example, different from those of the different embodiments described in FIG. 3. In other embodiments, more than one of the modules described in FIG. 3 can be combined into a single module. One or more of the functionalities or operations provided by different modules described in FIG. 3 can be shared between different modules and/or can be combined such that a single module provides the functionality or operation. Other embodiments of the mobile interactive services system 300 can include one or more modules that can support additional mobile interactive satellite services.

Figure 4B:
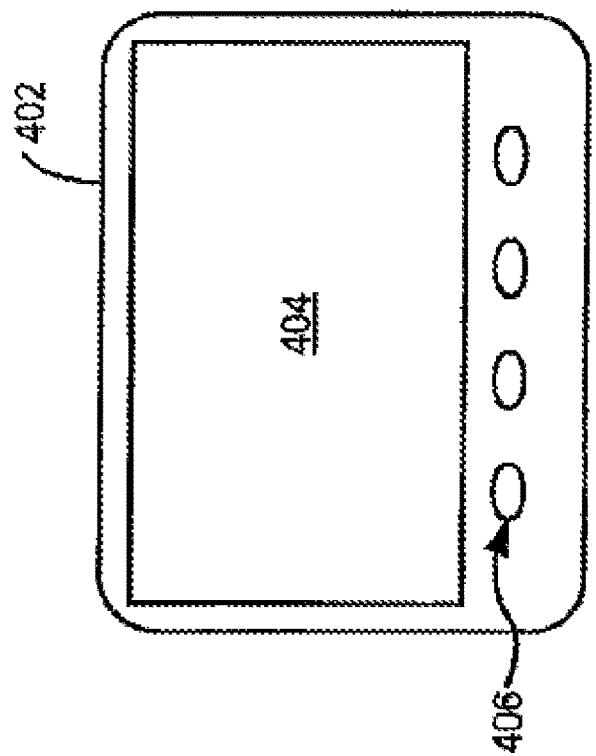
FIGS. 4A-4B are front views of controllers and passenger devices for use with a hybrid satellite and terrestrial communication network, according to embodiments of the invention.
Figure 4A:
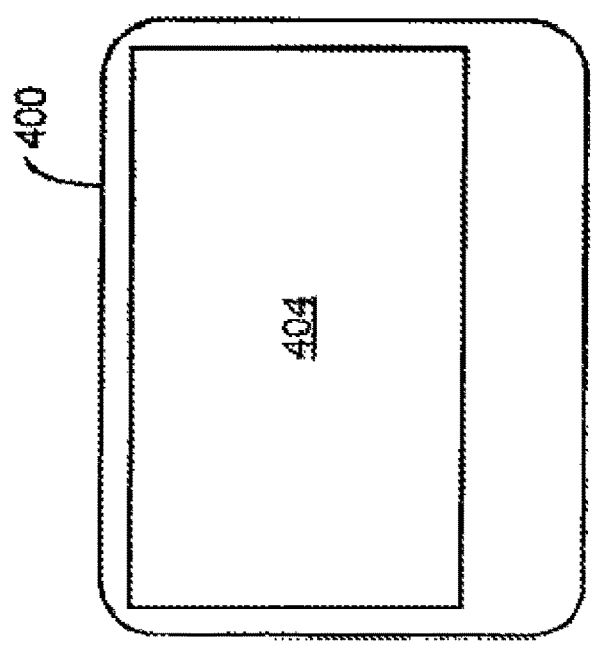

FIGS. 4A-4B are front views of controllers and passenger devices for use with a hybrid satellite and terrestrial communication network, according to embodiments of the invention. FIG. 4A shows a front view of a module 400, which can be a controller module, or a passenger device module as described in FIGS. 2 and 3, for example. The module 400 can include a display screen 404 that can be configured to graphically represent or display data, including data related to mobile interactive satellite services such as navigation services and/or travel assistance services, for example. In some embodiments, the display screen 404 can be a touch-screen display, for example, which can be used to enter data, such as alphanumeric data and/or selection data. The data entered through a touch-screen display can be subsequently processed by a mobile interactive services system to provide appropriate operations for mobile interactive satellite services. In some instances, certain operations and/or selections can be activated by touching an icon or other graphical or visual representation displayed on the screen. In other instances, certain operations and/or selections can be activated by gesturing and/or writing on the touch-screen display.

FIG. 4B depicts a front view of a module 402 that can include the display screen 404. Along with the display screen 404, the module 402 can include one or more controls 406 (e.g., buttons) that can be used to enter data, such as alphanumeric data and/or selection data. For example, one or more of the controls 406 can be used as soft buttons that provide a different set of selection options. In another example, one or more of the controls 406 can be used as hard buttons that provide a fixed set of selection options, such as setting the module to an ON or OFF state. The controllers or passenger devices described in FIGS. 4A-4B can detect selections made by a user through the user interface provided by the display screen 404 and/or the controls 406.

The modules 400 and 402 can include audio and/or visual components (not shown) that can be used to input and/or output data. In one example, a speaker (not shown) can be included to provide a user with audio navigation instructions or with audio travel assistance instructions. In another example, a microphone (not shown) can be used to provide a mobile interactive services system with spoken selections or spoken input data, such as speaking an assistance category or speaking a current location or address. In yet another example, a camera (not shown) can be included to detect user motions, gestures, and/or signals that can correspond to a data entry operation.

As described above, controllers in a mobile interactive services system can be used to provide a user interface for mobile interactive satellite services that can be supported through a network such as the hybrid satellite/terrestrial communication network 100. Travel assistance services, for example, can use the interactive aspect of the hybrid satellite/terrestrial communication network 100 to offer users a wide geographic coverage and a more flexible, effective, and/or feature-rich travel assistance experience.

Figure 5:
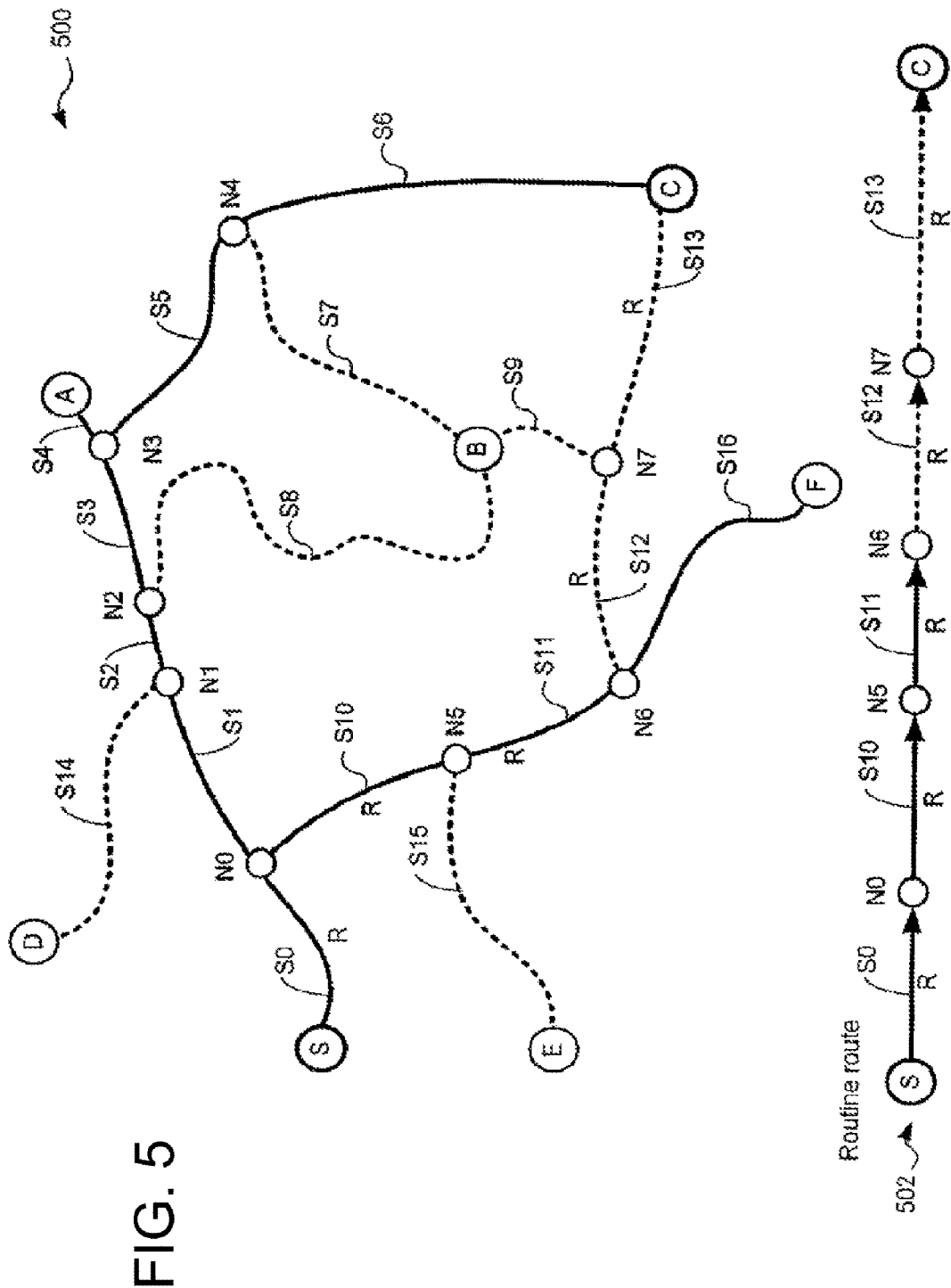
FIG. 5 is a schematic representation of a navigation map including routine trip data, according to an embodiment of the invention.

FIG. 5 is a schematic representation of a navigation map, including routine trip data, according to an embodiment of the invention. As shown in FIG. 5, a navigation map 500 can be a graphical representation of a geographic area or region that includes information regarding multiple locations (e.g., towns, cities, places, landmarks, addresses) and/or road information (e.g., road identification, road lanes, exit identification, road intersections and junctions, speed limits). The geographic region in the navigation map 500 can correspond to a region for which mobile interactive satellite services can be provided. In this regard, the navigation map 500 can include information that can be used by a mobile interactive travel assistance service to determine and/or provide travel assistance instructions and/or other assistance-related data.

In the example shown in FIG. 5, the navigation map 500 can include multiple locations S, A, B, C, D, E, and F, multiple road or route segments, and/or multiple road or route nodes. A route segment can refer to a road or to a portion of a road between two route nodes, for example. As shown, a solid-line route segment can be associated with a large road, such as a highway, for example, and a dotted-line route segment can be associated with a local road, such as a back road or a rural road, for example. In this regard, a solid-line route segment can generally correspond to a route segment in which a driver can travel at a faster speed than when traveling through a dotted-line route segment. For example, local roads tend to have fewer lanes of traffic and have more traffic lights, both of which may tend to reduce the average travel speed. A route node can refer to an intersection or junction between two or more route segments, for example. In some instances (not shown), a route node can also refer to a location or landmark in a route segment that need not be associated with a road intersection or junction.

Within the geographic area described by the navigation map 500, multiple different trips can occur. For example, for a trip between location S and location A, route segments S0, S1, S2, S3, and S4 and nodes N0, N1, N2, and N3 maybe traversed. In another example, for a trip between location S and location B, route segments S0, S1, S2, and S8 and nodes N0, N1, and N2 may be traversed. Traveling between location S and location C, for example, may involve traversing route segments S0, S10, S11, S12, and S13 and nodes N0, N5, N6, and N7. In yet another example, traveling between location A and location F may involve traversing route segments S4, S5, S6, S13, S12, and S16 and nodes N3, N4, location C, N7, and N6.

In some instances, there may be more than one possible route for a trip that involves going from a first location to a second location. For example, a first route for a trip starting at location S and having as destination location B can include traversing route segments S0, S1, S2, and S8 and nodes N0, N1, and N2. A second route for a trip starting at location S and having as destination location B can include traversing route segments S0, S10, S11, S12, and S9 and nodes N0, N5, N6, and N7, for example. The first and second routes can differ in multiple aspects, including total travel distance, travel time, average travel speed, route segments and/or nodes traversed, travel areas or neighborhoods, ease or comfort in traveling (e.g., highway traffic or local road traffic), and/or costs (e.g., tolls), for example.

Differences in routes for a particular trip can result in a user of a mobile interactive services system (e.g., a driver or vehicle passenger) having a preference for one route over another route. In this regard, the user may routinely or regularly prefer to travel using a particular route for trips between specified locations. An example of a regularly occurring trip can be going from the user's home to their place of work at the beginning of a work day. Another example of a regularly occurring trip can be the return trip home at the end of the work day. In this regard, the user or driver can have a preference for one of multiple possible routes that may be available when traveling to and from work, for example.

A regularly occurring trip can be referred to as a routine trip and the route segments traversed during the routine trip can be referred to as routine route segments, for example. As described above, a mobile interactive navigation system can be used to collect historical trip data which can be processed to determine whether a trip occurs with a sufficient degree of regularity to be a routine trip. Historical trip information that can be processed to determine whether a trip is a routine trip can include, but need not be limited to, starting and destination locations, departure time, arrival time, and/or day of travel (e.g., Monday, weekday, weekend). In some instances, the mobile interactive navigation system can process the historical trip data while in other instances the historical trip data can be communicated to a provider of navigation and/or travel assistance services for processing. In the example shown in FIG. 5, a routine trip 502 can include traveling from a location S to a destination at location C. The routine trip 502 can include a route that traverses route segments S0, S10, S11, and S12 and nodes N0, N5, N6, and N7. In this example, an "R" can be used to label routine route segments associated with the routine trip 502.

In some instances, a user may prefer to use routine route segments when making a trip that is different from the routine trip 502. In the example shown in FIG. 5, to travel from location S to a destination at location B, a user can select between, for example, a first route that includes traversing route segments S0, S1, S2 and S8 and route nodes N0, N1, and N2, and a second route that includes traversing route segments S0, S11, S12, and S9 and route nodes N0, N5, N6, and N7. In this instance, the user or driver may prefer the second route over the first route because it includes routine route segments S0, S10, S11, and S12 with which the user may be more comfortable and/or familiar, for example.

Routine route segments can be temporally defined, that is, can be associated with a specific time of day and/or with specific days. In some instances, a route segment can be a routine route segment for a first trip but may not be a routine route segment for a second trip because of the time and/or day in which the second trip is occurring.

Figure 6A:
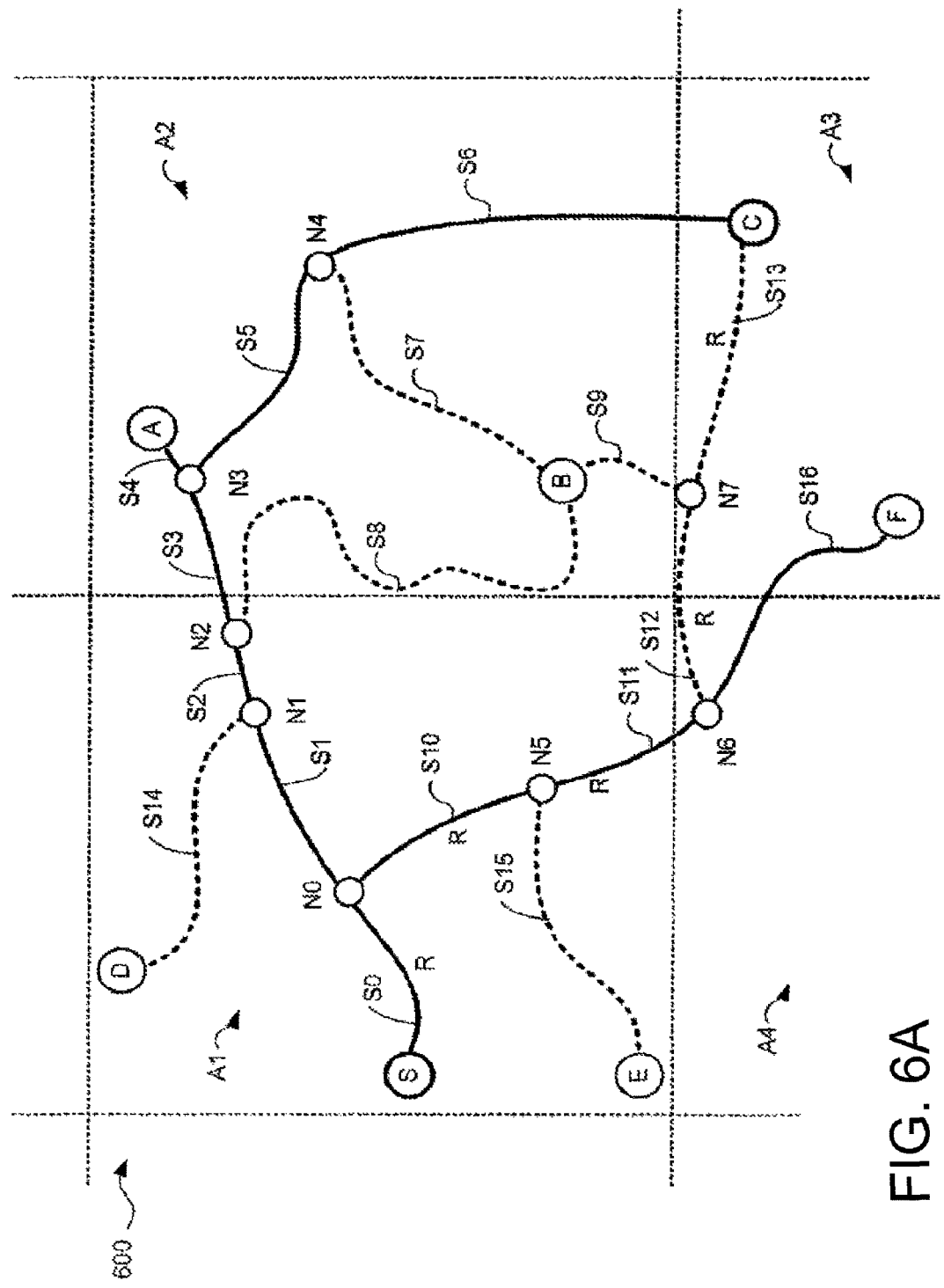
FIG. 6A is a schematic representation of a navigation map including defined areas, according to an embodiment of the invention.

FIG. 6A is a schematic representation of a navigation map including defined areas, according to an embodiment of the invention. FIG. 6A depicts a navigation map 600 that includes the location information and road information described in FIG. 5, Also shown are multiple areas A1, A2, A3, and A4. The areas A1, A2, A3, and A4 can each have a specified or defined geographic area, however, they need not have similar areas, shapes, contours, and/or outlines. In other embodiments, the areas can have different areas, shapes, contours, and/or outlines from those described in FIG. 6A. Moreover, other embodiments can include a different number of areas than the number used in the example in FIG. 6A. Each of the locations S, A, B, C, D, E, and F can be located within one of the areas A1, A2, A3, and A4, for example. For example, locations S, D, and E can be located within area A1. In another example, locations C and F can be located within area A3. In some instances, such as when a location is at a boundary or interface between areas, the location may be included within more than one of the areas A1, A2, A3, and A4.

A starting area can refer to an area or region in which the starting point of a trip is located, for example. Similarly, a destination area can refer to an area or region in which the destination of a trip is located, for example. For instance, when traveling from location S to location A, a user of a mobile interactive services system can start at location S in area A1 and can arrive at location A in area A2. In this example, area A1 is the starting area and area A2 is the destination area. When traveling between any two locations in the navigation map 600 in FIG. 6A, a user or driver may travel from one area to another area or may travel within one of the areas (i.e., the starting and destination areas can be the same).

A user of a mobile interactive services system may routinely or regularly prefer to travel to a specific destination area. For example, the user's place of work, preferred supermarket, and preferred shopping mall may all be located in area A3. A regularly occurring destination area can be referred to as a routine destination area, for example. As described above, a mobile interactive navigation system can be used to collect historical trip data which can be processed to determine whether a particular destination area occurs with a sufficient degree of regularity to be a routine destination area.

Destination areas can be temporally defined, that is, can be associated with a specific time of day and/or with specific days. In some instances, a destination area can be a routine destination area for a first trip but may not be a routine destination area for a second trip because of the time and/or day in which the second trip is occurring.

Figure 6B:
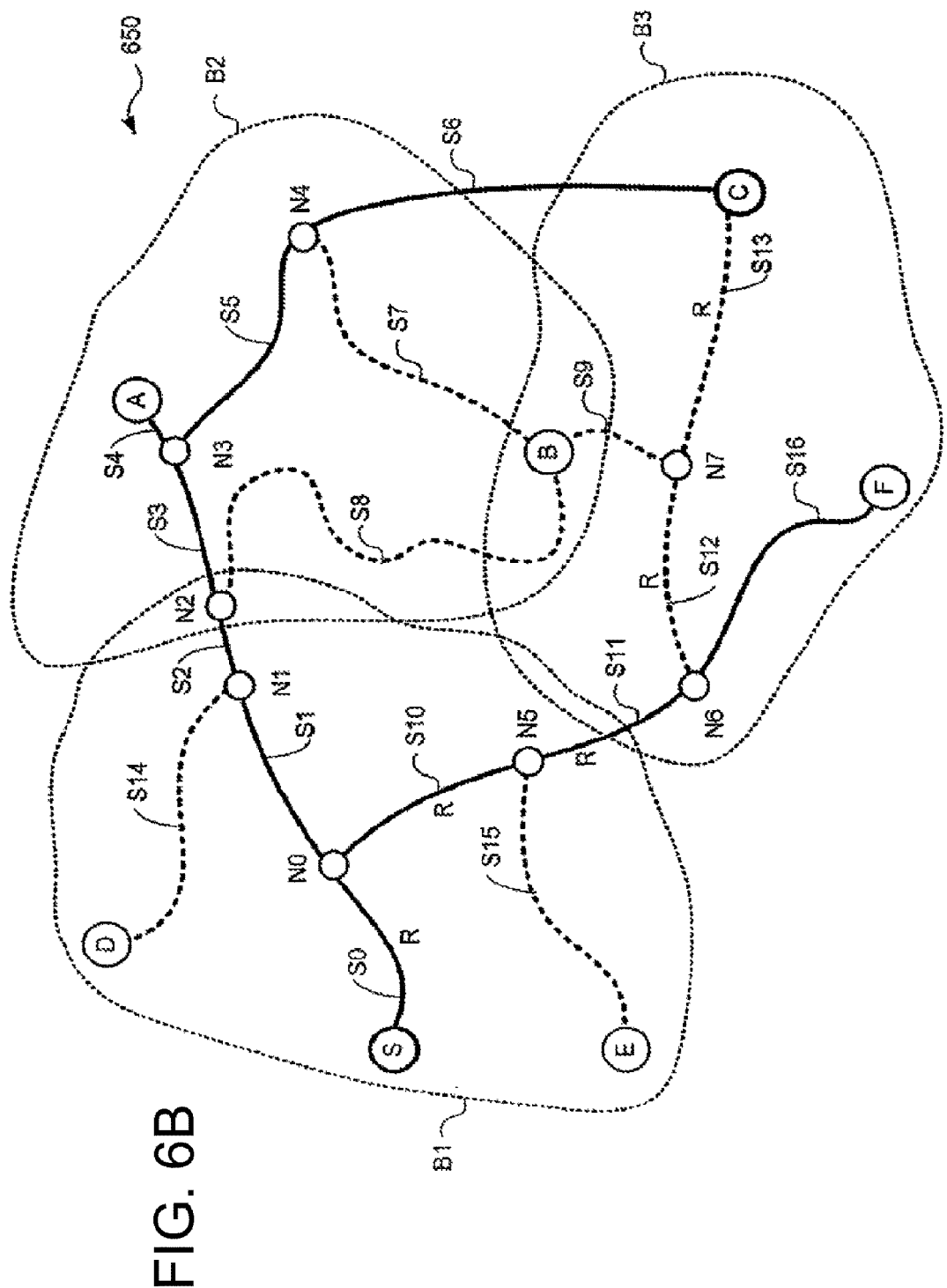
FIG. 6B is a schematic representation of a navigation map including dynamic areas, according to an embodiment of the invention.

FIG. 6B is a schematic representation of a navigation map including dynamic destination areas, according to an embodiment of the invention. FIG. 6B depicts a navigation map 650 that includes the location information and road information described in FIGS. 5 and 6A. Also shown are multiple areas B1, B2, and B3, which can each be dynamically specified or defined based on, for example, historical trip data. For instance, the area, contour, shape, and/or size of each of the areas B1, B2, and B3 can be adjusted or modified based on statistical information that can result from the processing of historical trip data. Areas B1, B2, and B3 can, in some instances, overlap such that a location in the navigation map 650 can be included in more than one of areas B1, B2, and B3. Moreover, as areas B1, B2, and B3 can dynamically change, whether a location is included within a specified area can vary over time.

For example, the home of a user of a mobile interactive services system can be in location S and the user may take short trips, such as for local grocery shopping, for example, to locations D and E. Thus, the geographic scope of area B1 may be at least partially determined from historical trip data collected from trips between the user's home and local shopping at locations D and E. Changes in the user's local shopping habits can result in changes to area B1. In another example, the user's place of work can be in location C. The user may generally stop at locations B and F (e.g., gas station, coffee shop) when traveling to and/or from work. Thus, the geographic scope of area B3 may be determined at least partially from historical trip data collected from trips to and/or from work. Changes in the user's travel habits to work (e.g., dropping off and/or picking up a child at daycare near location A) can result in changes to area B1.

As described above, a user of a mobile interactive services system may routinely or regularly prefer to travel to a specific destination area. For example, area B3 can be a routine destination area when the user travels to area B3 as a destination area with a sufficient degree of regularity. In this regard, the user can have a preference for route segments located within a routine destination area when making a trip. For example, when traveling from location S in area B1 to location B in areas B2 and B3, the user can select between, for example, a first route that includes route segments S0, S1, S2, and S8 and route nodes N0, N1, and N2, and a second route that includes route segments S0, S10, S11, S12, and S9 and route nodes N0, N5, N6, and N7. In this instance, the user can have a preference for the second route because it includes more route segments (e.g., S11, S12, and S9) associated with routine destination area B3 than the first route (e.g., S8).

In some instances, the user's travel preferences, including routine route segments and/or routine destination areas, for example, can be used to provide and/or adjust travel assistance instructions or data provided by a travel assistance service provider. For example, upon requesting travel assistance (e.g., requesting auto repair assistance, medical care assistance) through a mobile interactive services system, a user may receive navigation data and/or other data related to one or more assistance providers. The user may select or accept one from multiple available assistance providers based on, for example, preferences in the routes to and/or from the assistance providers. For example, when traveling to receive medical care, a user can prefer a medical care facility for which the route to the facility uses routine route segments and/or the medical care facility is located in a routine destination area. In another example, when requesting auto repair service, a user can prefer an auto repair shop for which an assistance vehicle dispatched by the auto repair shop would use routine route segments in reaching the place where assistance is desirable, and/or the auto repair shop is located in a routine destination area.

Figure 7:
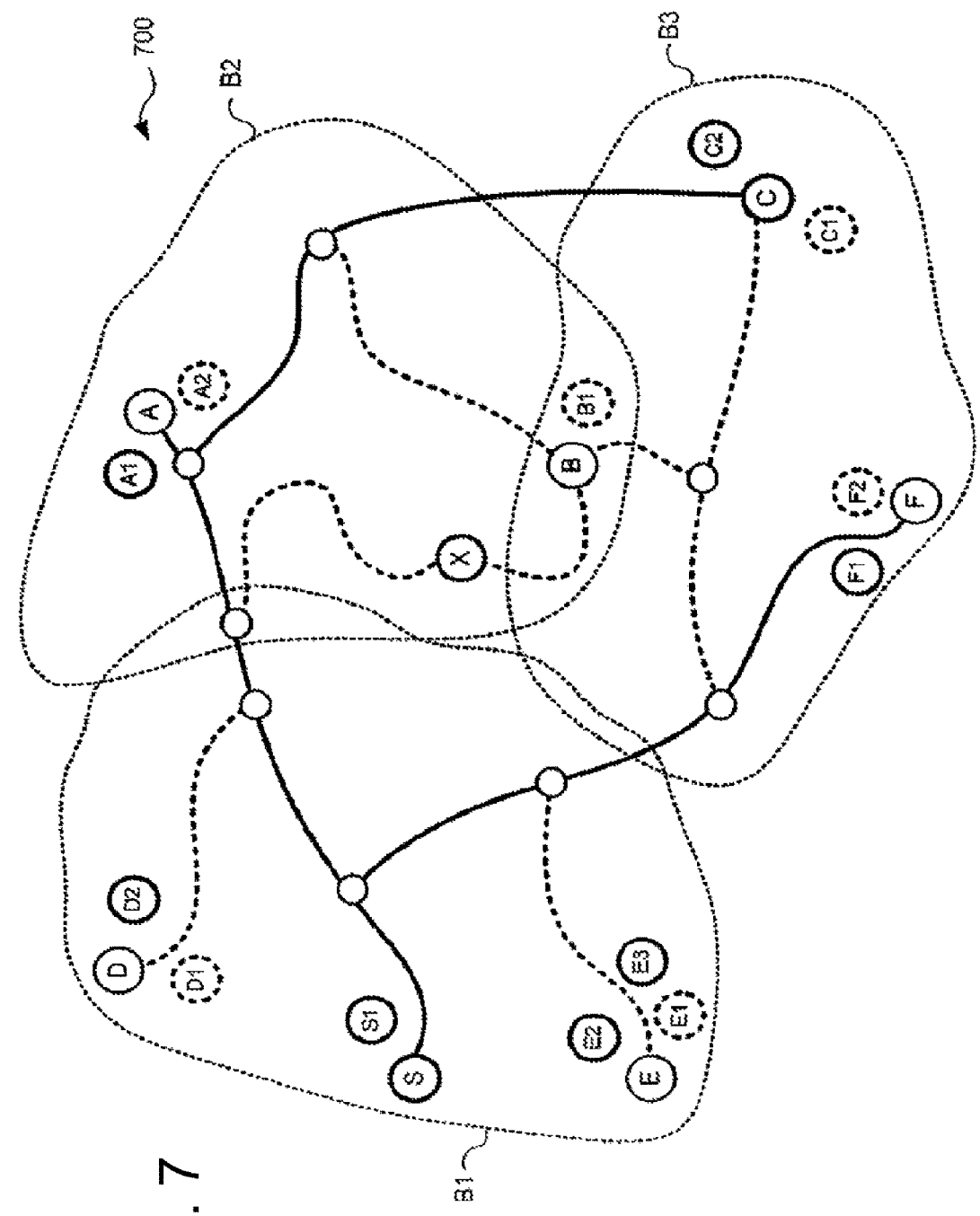
FIG. 7 is a schematic representation of navigation data including location of assistance request and of multiple assistance providers, according to an embodiment of the invention.

FIG. 7 is a schematic representation of navigation data including location of the assistance request and of multiple assistance providers, according to an embodiment of the invention. FIG. 7 depicts a navigation map 700 that includes the location information, road information, and area information described in FIG. 6B. Also shown are multiple assistance service providers (e.g., auto repair shops, gas stations, police stations, medical centers) that can be associated with an assistance category. For medical assistance requests, for example, the assistance providers illustrated in FIG. 7 can include police stations and/or medical centers. In another example, for auto repair assistance the assistance providers in FIG. 7 can include auto repair shops.

In the example shown in FIG. 7, the assistance providers can be located near one of the locations S, A, B, C, D, E, and F. For instance, the assistance provider S1 is shown near location S and assistance providers A1 and A2 are shown near location A. Other assistance providers also shown in the example in FIG. 7 include B1, C1, C2, D1, D2, E1, E2, E3, F1, and F2. In some instances, one or more assistance providers may be recommended (e.g., highly or positively rated) by a community-of-interest (COi) to which the user belongs and/or participates. In this example, COi-recommended assistance providers are shown in solid lines and those not recommended by a COi are shown in dotted lines. The user can, for example, have a preference to use or select an assistance provider that is recommended by a COi. Also shown in the navigation map 700 is a location X that can correspond to the location of the vehicle or person that requested the assistance. In some instances, location X can correspond to the current location of the vehicle or person that requested assistance, which can be different from the location at which the assistance request took place.

The request for assistance can result from the user's own perception or experience (e.g., flat tire, ill passenger, low oil light on in dashboard) or from an automated event (e.g., vehicle diagnostics system activates request for assistance) that engages the mobile interactive services system to contact a travel assistance service. In one embodiment, the travel assistance service can provide the user with data related to one or more assistance providers that correspond to the desired assistance such that the user can select a preferred assistance provider. In another embodiment, the travel assistance service can provide a service center with which the user can communicate to make the assistance request. The service center can subsequently provide the user with data related to an assistance provider. In some instances, the user may accept the assistance provider suggested by the service center. In other instances, the user may prefer a different assistance provider than the one suggested based on, for example, the user's own prior experience with the originally suggested assistance provider.

In some embodiments, at least a portion of the data related to the assistance providers (e.g., navigation data, name of place, location, scope of services provided) can be graphically represented in the mobile interactive services system to assist the user in the selection process. In this regard, data related to the assistance providers can be graphically represented to indicate a relative preference between multiple assistance providers based on, for example, travel preferences and/or COi recommendations.

Figure 8:
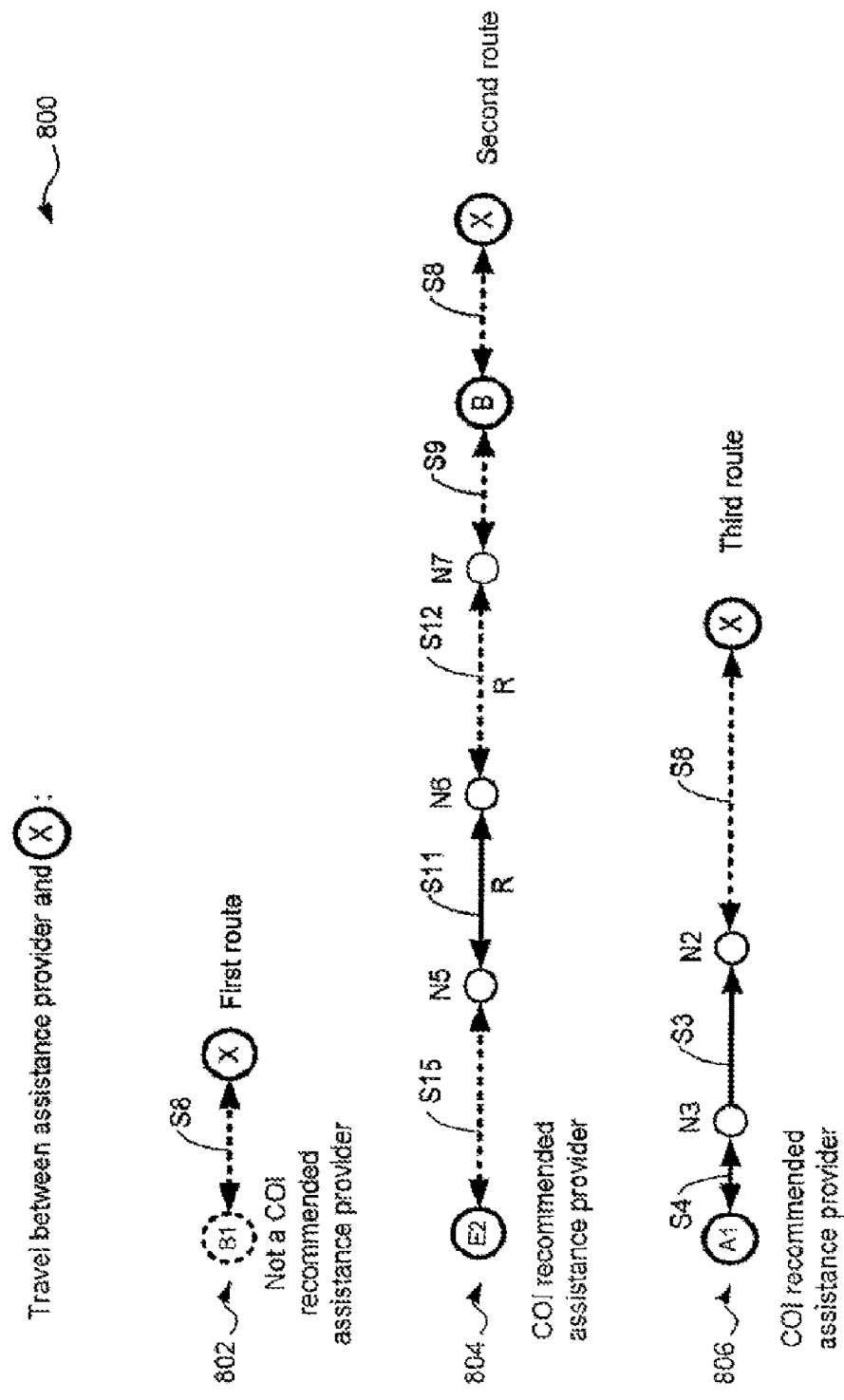
FIG. 8 is a schematic representation of navigation data related to the multiple assistance providers, according to an embodiment of the invention.

FIG. 8 is a schematic representation of navigation data related to the multiple assistance providers, according to an embodiment of the invention. Shown in FIG. 8 is a travel diagram 800 that includes information related to multiple travel or navigation routes between different assistance providers and location X as described in FIG. 7. In some embodiments, a mobile interactive services system, such as the mobile interactive services systems 200 and 300 in FIGS. 2 and 3, respectively, can be used to collect, process, operate, display, and/or select data such as the navigation data illustrated in FIG. 8. The travel diagram 800 can have data that is based on collected and/or processed historical trip data, including route segment information (e.g. routine route segments) and/or travel area information (e.g., routine destination area). In some embodiments, at least a portion of the navigation data shown in FIG. 8 can be received from a travel assistance service through a hybrid satellite/terrestrial mobile communication network.

The example illustrated by the travel diagram 800 includes a first route 802 between location X and assistance provider B1, a second route 804 between location X and assistance provider E2, and a third route 806 between location X and assistance provider AI. Other examples can illustrate travel routes for a trip between locations X and other assistance providers different from those shown in FIG. 8. The first route 802 can correspond to, for example, a route resulting in the least amount of travel time and the shortest travel distance. In this regard, assistance can reach location X or can be sought from B1 in the shortest amount of time, for example. The first route 802 can include a portion of route segment S8, which is not a routine route segment (R). In this example, the assistance provider B1 is not recommended (e.g., not highly rated, negative reviews, not covered) by a community or group of interest to the user.

The second route 804 can correspond to, for example, a travel route resulting in the multiple routine route segments being used. The second route 804 can include route segments S15, S11, S12, S9, and S8, of which route segments S11 and S12 are routine route segments (R). The second route 804 can result in the longest travel distance and/or the most travel time. In this regard, assistance can reach location X or can be sought from B1 in the most amount of time, for example, when compared to the first route 802 and the third route 806. For the second route 804, the assistance provider E2 is recommended (e.g., highly rated, positive reviews, covered) by a community or group of interest to the user.

The third route 806 can correspond to, for example, a travel route that can include route segments S4, S3, and S8, none of which is a routine route segment (R). The third route 806 can result in neither the longest or shortest travel distance nor the most or least travel time. For the third route 806, the assistance provider A1 is recommended (e.g., highly rated, positive reviews, covered) by a community or group of interest to the user.

In the example illustrated by the travel diagram 800, when determining an assistance provider, a user of a mobile interactive services system can have a preference for, for example, the fastest travel route, the shortest travel route distance, the travel route with the most routine route segments, the travel route to a routine destination area, and/or a combination of the above. Based on these preferences, the user may select the navigation data of one of the assistance providers in the travel diagram 800. For example, the user can prefer the second route 806 because it includes a large number of routine route segments and because assistance provider E2 is recommended by a COi. Routine route segments and positive ratings or reviews may give the user a level of comfort, ease, and/or familiarity from previous experiences (e.g., previous trips) that can overcome, in some instances, the benefits of faster travel times and shorter travel distances provided by the first route 802 and the third route 806, respectively.

A user's preferences can be included in the navigation data to and from an assistance provider that is provided by a travel assistance service through a mobile interactive services system. In some embodiments, the mobile interactive services system can process the user's preferences to generate at least a portion of the navigation data illustrated by the travel diagram 800. In other embodiments, a travel assistance service can process the user's preferences and communicate navigation data that is based on these preferences to the mobile interactive services system through a hybrid satellite/terrestrial communication network.

The processing of a user's preferences can include providing a weight, ranking, and/or priority to multiple aspects of a trip to and/or from an assistance provider such as, but need not limited to, travel time, travel distance, starting and/or destination location, destination area information, route segment information, traffic conditions, time of day, day of travel, and/or COi rating. The weighted aspects of the trip can be combined to determine a criterion that can be used to select one of the assistance providers that are possible for a particular assistance request. In one example, the combination can be a linear combination while in another example the combination can be non-linear. In one embodiment, the criterion can be used to graphically represent a relative preference between multiple assistance providers for user selection.

In another embodiment, at least one criterion can be used by a travel assistance service operated through a mobile interactive services system to determine a preferred assistance provider. For example, when a user connects with a service center to obtain travel assistance, the service center operator may provide the user with a preferred assistance provider. The navigation data of the preferred assistance provider can be made available (e.g., graphically represented or displayed on a display screen) to the user through a mobile interactive services system. In some embodiments, routine route segments, routine destination areas, and/or COi ratings or reviews may be given significant weight when determining the criterion from which to select an assistance provider.

Figure 9A:
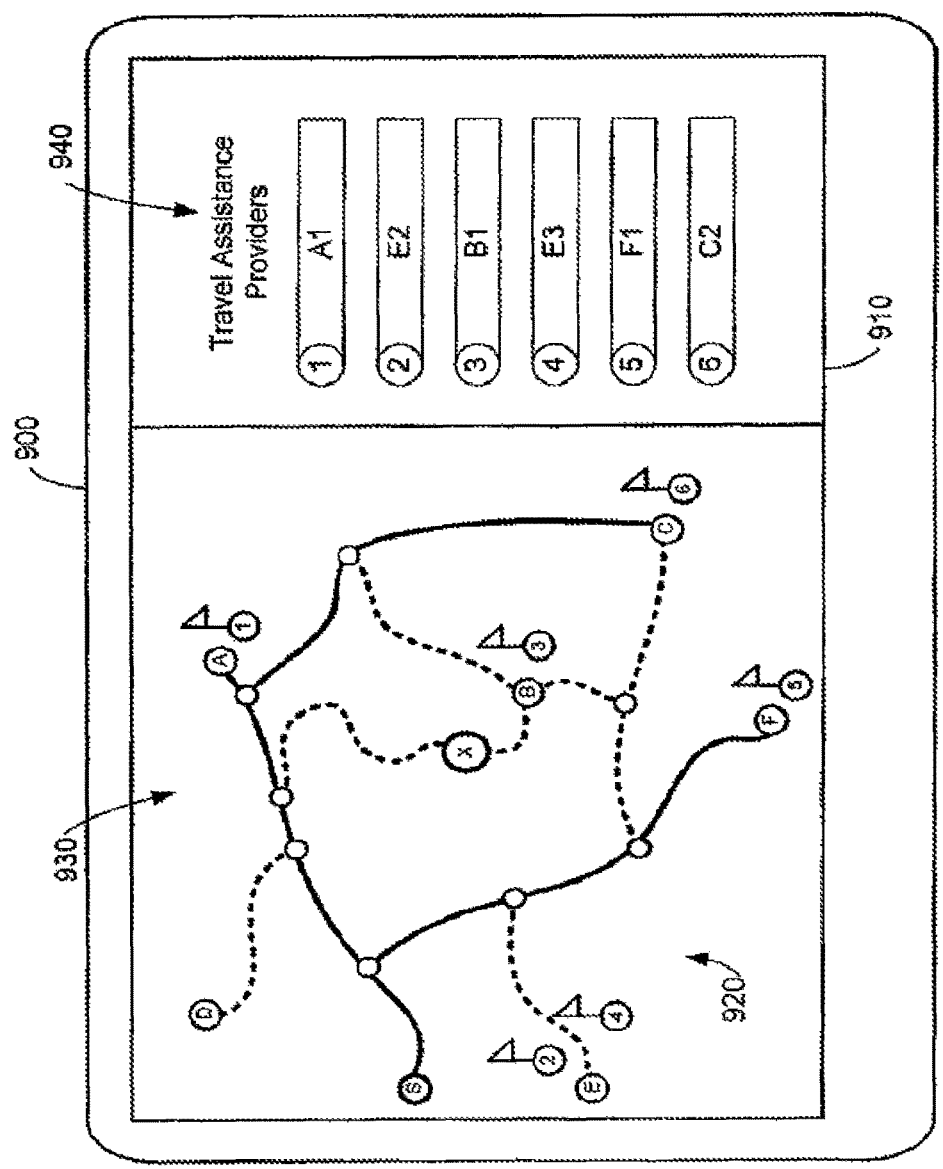
FIG. 9A is a front view of a controller that can graphically display data related to assistance providers, according to an embodiment of the invention.

FIG. 9A is a front view of a controller that can graphically display data related to assistance providers, according to an embodiment of the invention. As shown in FIG. 9A, a mobile interactive services system can include a controller 900 having a display screen 910. In some embodiments, the controller 900 can include at least a portion of the functionality provided by the controller module 210 described in FIG. 2. The display screen 910 can have a first portion 930 and a second portion 940. In other embodiments, the display screen 910 can include more or fewer portions than those described in FIG. 9A.

The first portion 930 of the display screen 910 can be used to graphically or visually represent information related to, for example, a navigation map 920. In the example shown in FIG. 9A, the navigation map 920 can include location information (e.g., towns, cities, addresses, names of places, landmarks) and road information as described in the examples in FIGS. 5, 6A, 6B, and 7. The navigation map 920 can include data related to assistance providers associated with a particular assistance request such as medical care assistance, for example. The assistance request can result in an assistance provider search based on the type of assistance requested. The navigation map 920 can include the location X associated with the place where assistance is desirable. A user or a vehicle diagnostic system, for example, can initiate the assistance request through the controller 900. The second portion 940 of the display screen 910 can be used to graphically or visually represent, for example, the relative organization of the assistance providers that results from considering the user's travel preferences (e.g., historical trip data) and/or community ratings or reviews. In this example, the assistance providers can be listed (e.g., numerical listing) from top to bottom in order of preference. In other embodiments, different graphical representations of assistance provider preferences can be used that may be different from those described in FIG. 9A. A user can select any one assistance provider and need not select the assistance provider with the highest relative preference. In one embodiment, the display screen 910 can be a touch screen, for example, such that a user can select one of the assistance providers through the display screen 910. In another embodiment, the controller 900 can include buttons that can be used to select an assistance provider from those graphically represented on the display screen 910.

Figure 9B:
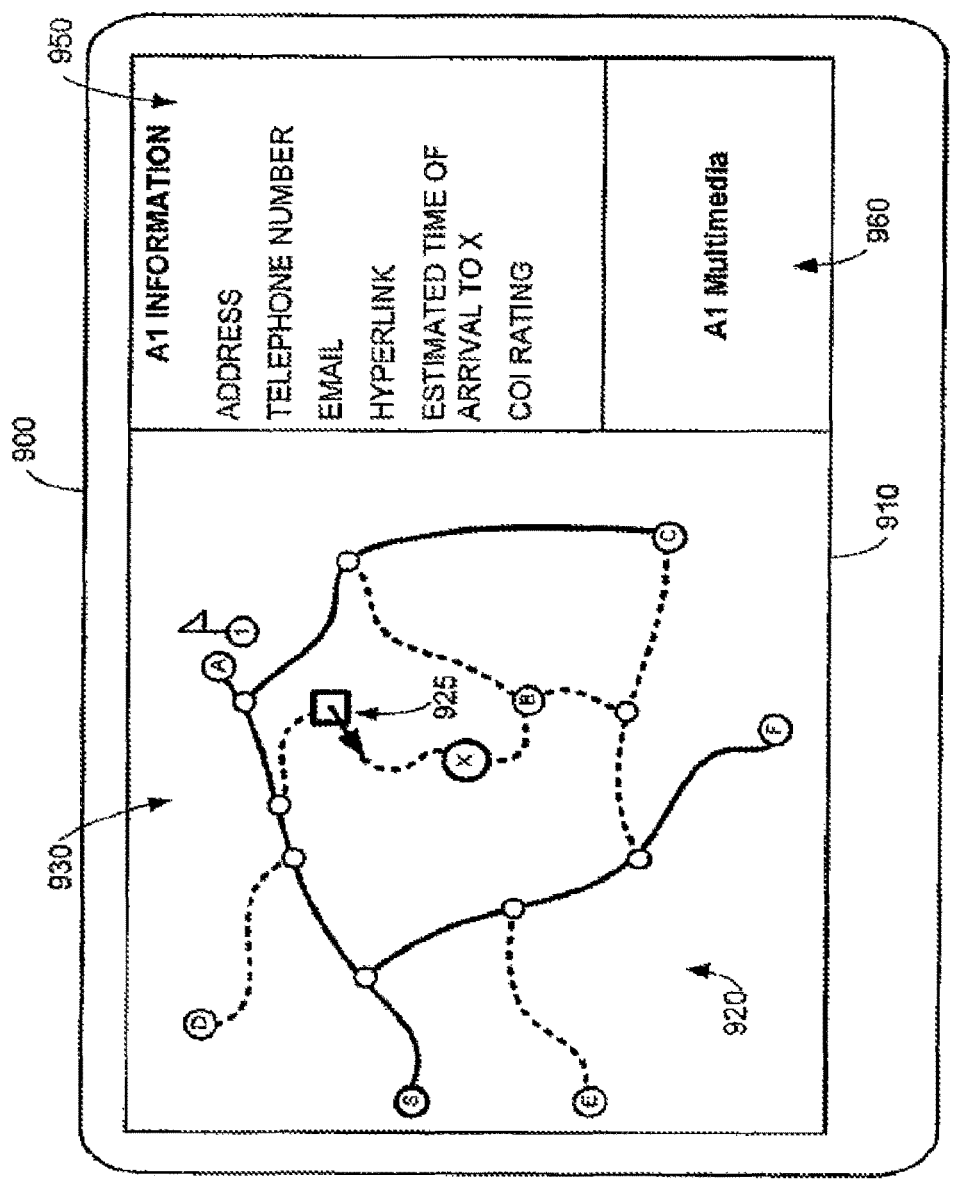
FIG. 9B is a front view of a controller that can graphically display navigation data and other data related to a dispatched assistance vehicle from a selected assistance provider, according to an embodiment of the invention.

FIG. 9B is a front view of a controller that can graphically display navigation data and other data related to a dispatched assistance vehicle from a selected assistance provider, according to an embodiment of the invention. In the example shown in FIG. 9B, the user has selected or accepted assistance provider A1 from the multiple assistance providers that resulted from the assistance category search. The display screen 910 can be used to provide navigation or guidance data and/or additional data related to the assistance provider A1. In this regard, the display screen 910 can have the first portion 930, a second portion 950, and a third portion 960. In other embodiments, the display screen 910 can include more or fewer portions than those described in FIG. 9B.

The first portion 930 of the display screen 910 can include graphically or visually represented guidance or navigation data to assist the user in tracking an assistance or service vehicle 925 dispatched from the selected assistance provider (i.e., A1 in this example). The second portion 950 of the display screen 910 can include graphically or visually represented data related to the assistance provider A1, such as, for example, an address, a telephone number, an email, a hyperlink to a website, an estimated time of arrival at location X, and/or a COi rating and/or review of assistance provider A1 when available. In some embodiments, the user can communicate with an operator at the assistance provider A1 through the mobile interactive services system. The third portion 960 of the display screen 910 can include, for example, multimedia information (e.g., advertisement, offers, commercial logos, audio content) related to the assistance provider A1.

Figure 9C:
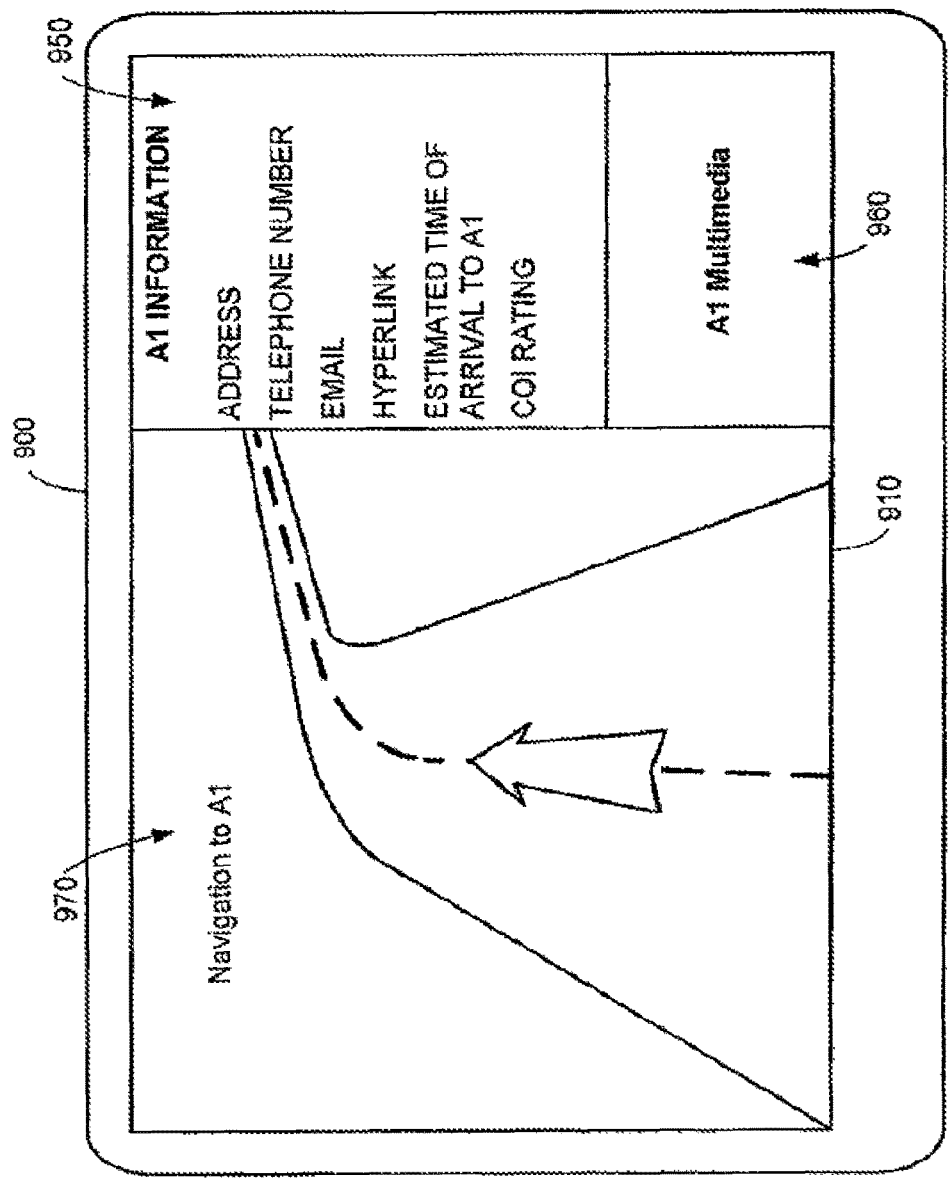
FIG. 9C is a front view of a controller that can graphically display navigation data and other data related to a selected assistance provider, according to another embodiment of the invention.

FIG. 9C is a front view of a controller that can graphically display navigation data and other data related to a selected assistance provider, according to another embodiment of the invention. In the example shown in FIG. 9C, the display screen 910 can be used to provide navigation or guidance data and/or additional data related to the selected assistance provider (i.e., assistance provider A1 in this example) such that the user can travel to the assistance provider. In this regard, the display screen 910 can have a first portion 970, the second portion 950, and the third portion 960. In other embodiments, the display screen 910 can include more or fewer portions than those described in FIG. 9C. The first portion 970 of the display screen 910 can include graphically or visually represented guidance or navigation data to assist the user in traveling from a current location X to the location of the assistance provider A1. The second portion 950 and the third portion 960 can be substantially as described in FIG. 9B.

Figure 10A:
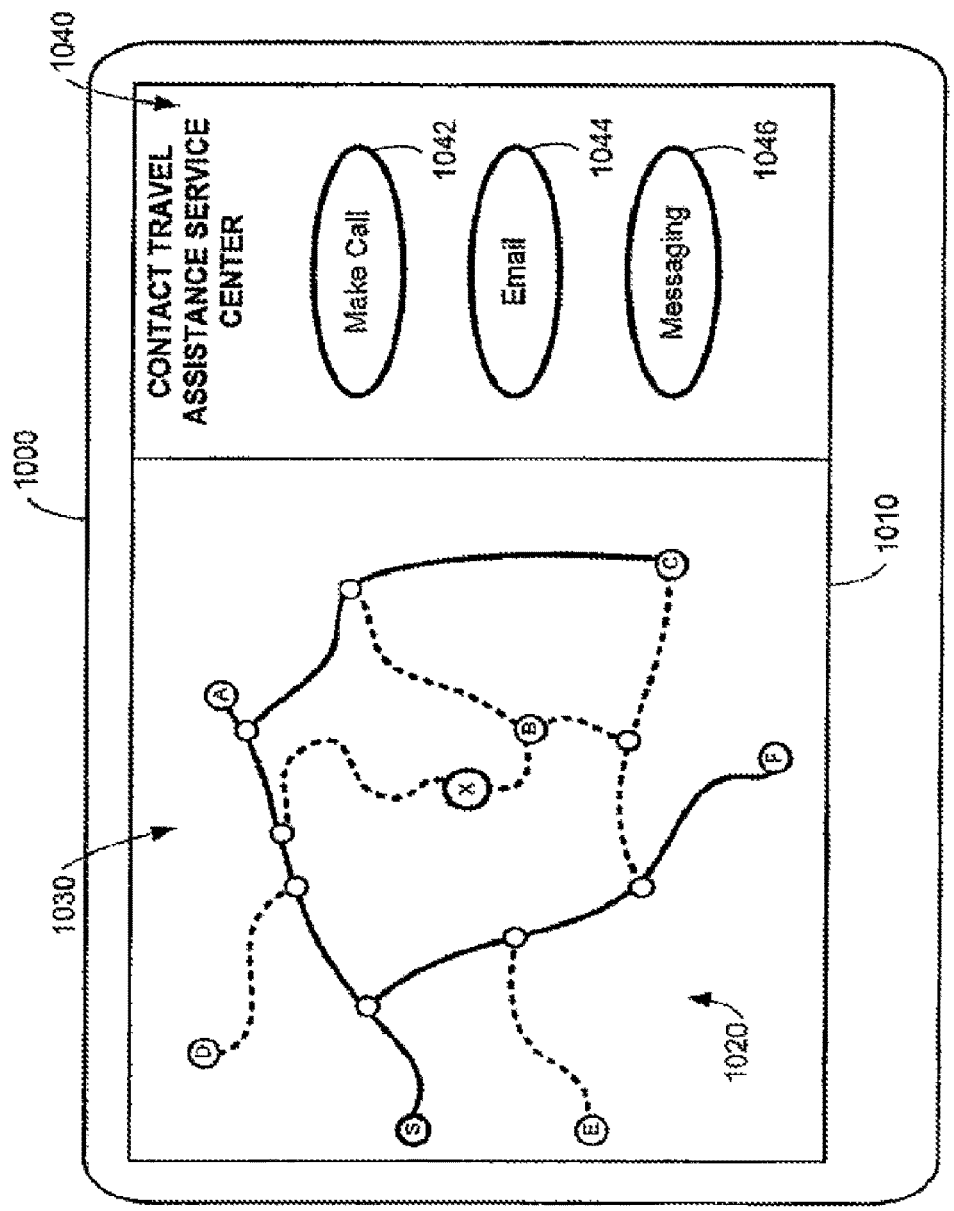
FIG. 10A is a front view of a controller that can graphically display on-screen operations for contacting a service center, according to an embodiment of the invention.

FIG. 10A is a front view of a controller that can graphically display on-screen operations for contacting a service center, according to an embodiment of the invention. As shown in FIG. 10A, a mobile interactive services system can include a controller 1000 having a display screen 1010. In some embodiments, the controller 1000 can include at least a portion of the functionality provided by the controller module 210 described in FIG. 2. The display screen 1010 can have a first portion 1030 and a second portion 1040. In other embodiments, the display screen 1010 can include more or fewer portions than those described in FIG. 10.

The first portion 1030 of the display screen 1010 can be used to graphically or visually represent information related to, for example, a navigation map 1020. The navigation map 920 can include data related to assistance providers associated with a particular assistance request and the location X associated with the place where assistance is desirable. The second portion 1040 of the display screen 1010 can be used as a user interface to contact a service center that provides travel assistance services. In one embodiment, the display screen 1010 can be a touch screen, for example, such that a user can select a manner of communication with the service center through the display screen 1010. In this example, the second portion 1040 can include a first screen icon 1042 to access the service provider through, for example, a voice-over-IP protocol connection. The second portion 1040 can include a second screen icon 1044 to access the service provider through, for example, electronic mail. The second portion 1040 can include a third screen icon 1046 to access the service provider through, for example, text messaging. In some embodiments, fewer or more manners of communications between the user and the service center can be provided through the controller 1000. In another embodiment, the controller 1000 can include buttons that can be used to select a manner of communication between the user and the service center.

Figure 10B:
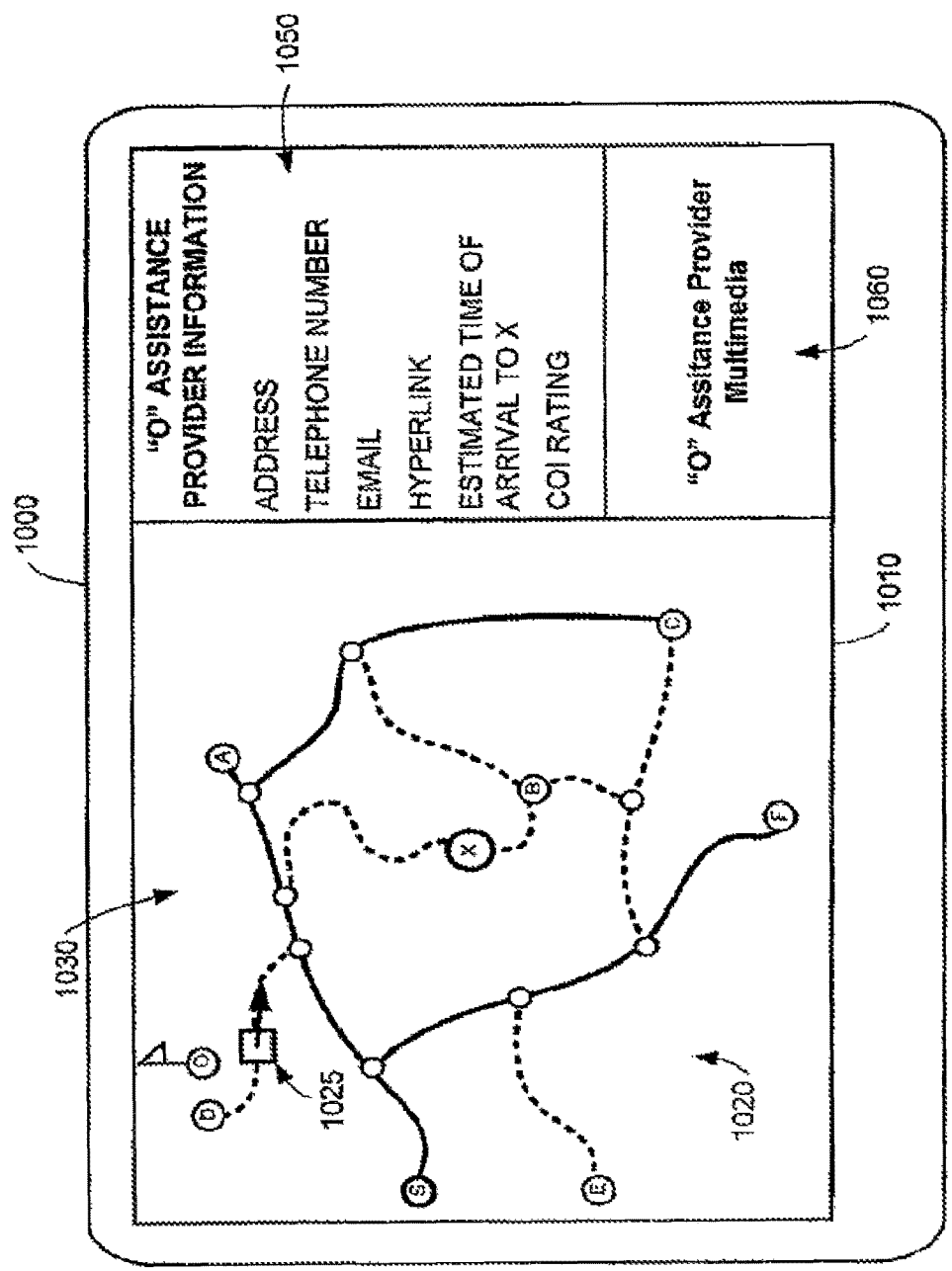
FIG. 10B is a front view of a controller that can graphically display navigation data and other data related to a dispatched assistance vehicle from an assistance provider offered by the service center, according to an embodiment of the invention.

FIG. 10B is a front view of a controller that can graphically display navigation data and other data related to a dispatched assistance vehicle from an assistance provider offered by the service center, according to an embodiment of the invention. In the example shown in FIG. 10B, the service center provides the user with assistance provider 0 near location D based on the assistance requested, location X, and/or user preferences (e.g., historical trip information, COi ratings). The display screen 1010 can be used to provide navigation or guidance data and/or additional data related to the assistance provider 0. In this regard, the display screen 1010 can have the first portion 1030, a second portion 1050, and a third portion 1060. In other embodiments, the display screen 1010 can include more or fewer portions than those described in FIG. 9B.

The first portion 1030 of the display screen 1010 can include graphically or visually represented guidance or navigation data to assist the user in tracking an assistance or service vehicle 1025 dispatched from the assistance provider that was provided by the service center (i.e., 0 in this example). The second portion 1050 of the display screen 1010 can include graphically or visually represented data related to the assistance provider 0, such as, for example, an address, a telephone number, an email, a hyperlink to a website, an estimated time of arrival at location X, and/or a COi rating and/or review of assistance provider 0 when available. In some embodiments, the user can communicate with an operator at the assistance provider 0 through the mobile interactive services system. The third portion 1060 of the display screen 1010 can include, for example, multimedia information (e.g., advertisement, offers, commercial logos, audio content) related to the assistance provider 0.

Figure 10C:
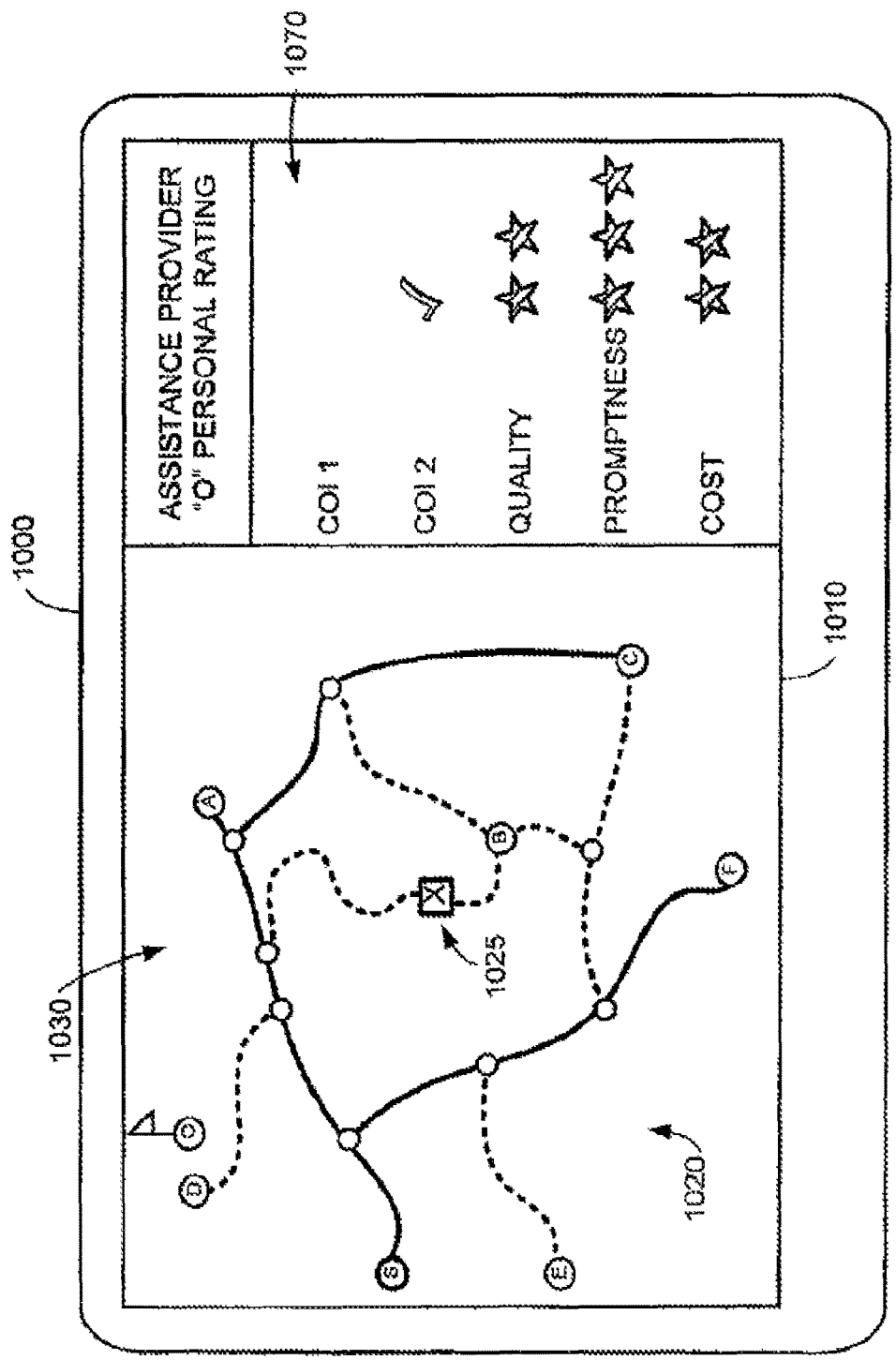
FIG. 10C is a front view of a controller that can graphically display feedback data provided to a community-of-interest related to the assistance provider, according to an embodiment of the invention.

FIG. 10C is a front view of a controller that can graphically display feedback data provided to a community-of-interest related to the assistance provider, according to an embodiment of the invention. As shown in FIG. 10C, after arriving at location X, the assistance or service vehicle 1025 can provide the appropriate assistance desirable. The display screen 1010 can graphically or visually illustrate the arrival of the assistance or service vehicle 1025 at location X. For example, in the first portion 1030 location X is shown as a square instead of a circle. The display screen 1010 can have a second portion 1070 that can be used to provide a review or rating of the service provided by the assistance Provider 0. The review or rating can be shared with communities or groups of interest to the user through a hybrid satellite/terrestrial communication network. The feedback of the service provided by the assistance Provider 0 can be numerical (e.g., ranking, number of stars) and/or descriptive (e.g., poor, good, above average).

Figure 11:
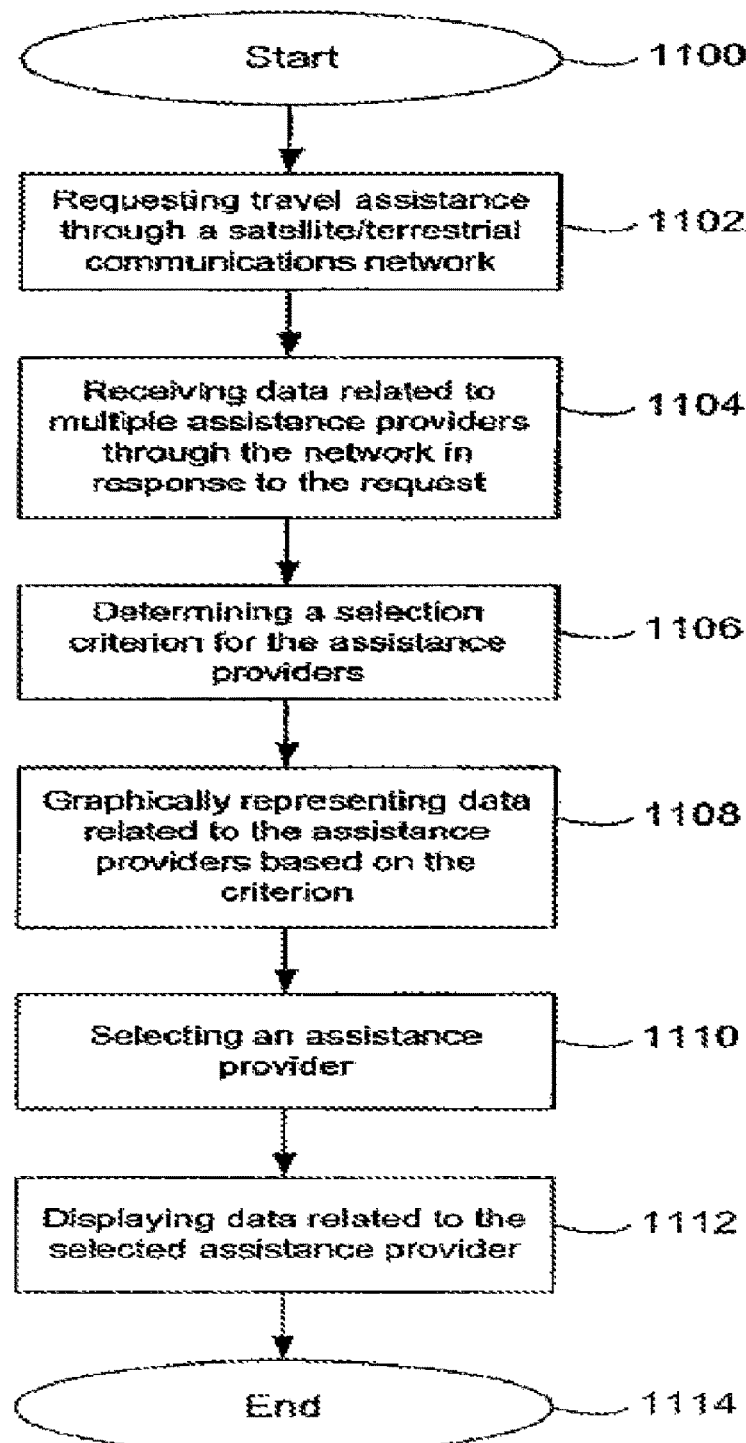
FIGS. 11-12 are flow charts illustrating a method according to an embodiment of the invention.

FIG. 11 is a flow chart illustrating a method for selecting a travel assistance service provider according to an embodiment of the invention. At 1102, after start 1100, a user can request travel assistance through a mobile interactive satellite service that supports travel assistance services. The mobile interactive satellite services can be provided through a mobile interactive services system and/or a hybrid satellite/terrestrial communication network. In some instances, the travel assistance request can result from a vehicle diagnostics system. At 1104, based on the type of assistance that is desirable, a search can be performed to provide one or more assistance providers. Data related to the assistance providers can be communicated to the mobile interactive services system through the hybrid satellite/terrestrial communication network, for example. At 1106, the mobile interactive services system can process the assistance provider data to determine at least one criterion (e.g., organizing assistance providers based on travel preferences and/or service ratings) to assist the user in the selection process.

At 1108, the mobile interactive services system can graphically represent and organize the assistance provider data based on the determined criterion or criteria. At 1110, the user can select or accept one of the assistance providers. The mobile interactive services system can detect the user selection and process the selection. At 1112, the mobile interactive services system can graphically display data related to the selected assistance provider (e.g., navigation data to and/or from the selected assistance provider, contact information) that can aid the user in obtaining and/or receiving the desired assistance. After 1112, the method can proceed to end 1114.

Figure 12:
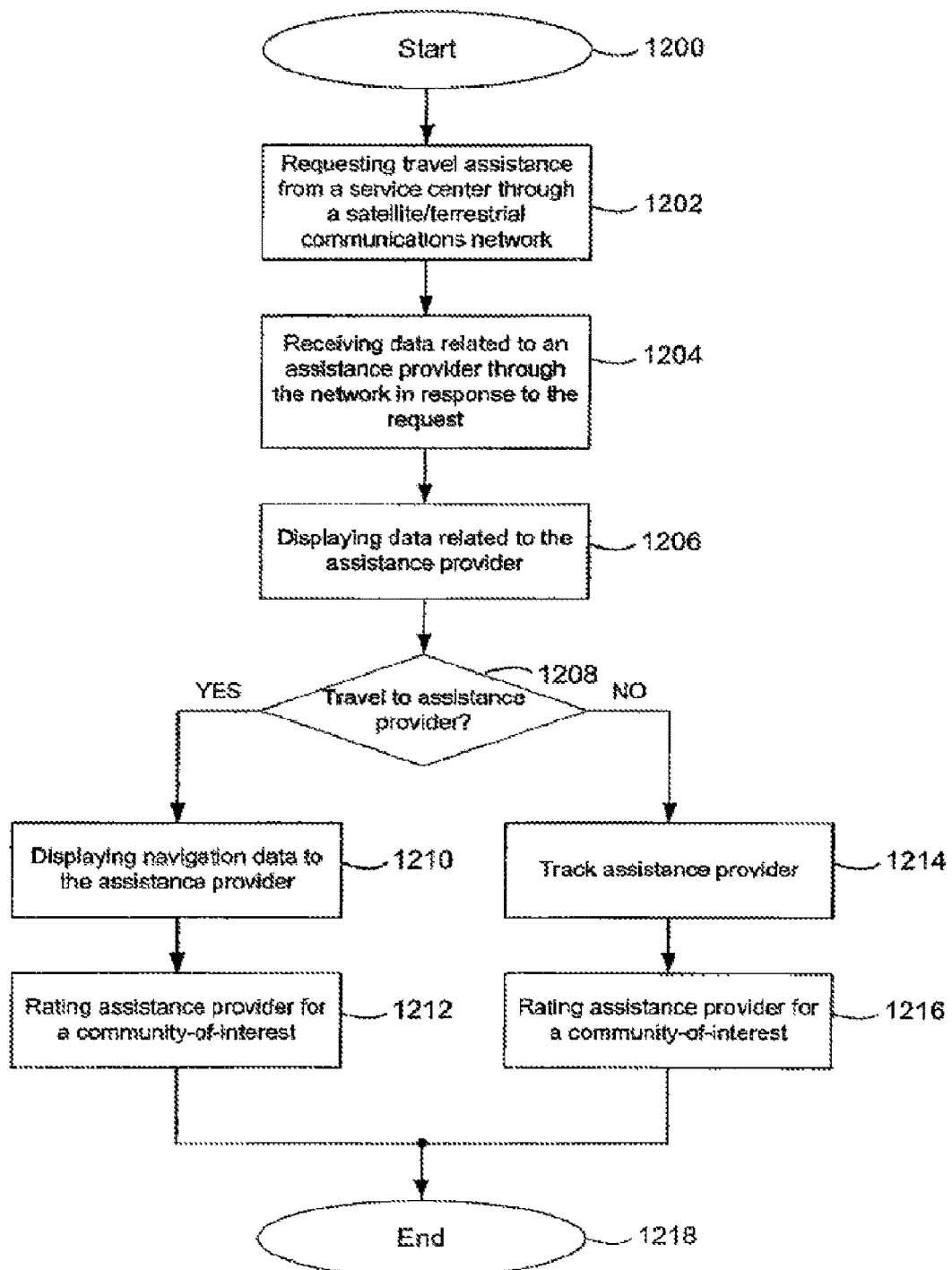

FIG. 12 is a flow chart illustrating a method for requesting travel assistance information from a service center according to an embodiment of the invention. At 1202, after start 1200, a user can request travel assistance from a service center (e.g., live operator, service center user interface) through a mobile interactive satellite service that supports travel assistance services. The mobile interactive satellite services can be provided through a mobile interactive services system and/or a hybrid satellite/terrestrial communication network. In some instances, the travel assistance request can result from a vehicle diagnostics system. At 1204, based on the type of assistance that is desirable, a search can be performed to provide an assistance provider. In this regard, when selecting an assistance provider, the travel assistance service can consider the location of where the service is to be provided, the user travel preferences, and/or ratings of possible assistance providers, for example. Data related to the assistance provider can be communicated from the service center to the user through the hybrid satellite/terrestrial communication network, for example. At 1206, the mobile interactive services system can graphically represent or display data related to the assistance provider offered by the service center.

At 1208, when the type of assistance is such that the user may prefer to travel to the assistance provider (e.g., medical care), the mobile interactive service system can at 1210 display navigation data to aid the user in reaching the assistance provider. Back at 1208, when the type of assistance is such that the user may prefer to have the assistance provider reach the user (e.g., auto breakdown), the mobile interactive service system can at 1214 display navigation data to provide tracking of a dispatched service vehicle from the assistance provider. At 1212 and 1216, after the service is rendered, the user can provide a rating or review of the assistance provider to be shared with others in certain communities or groups with common interests. After 1212 and 1216, the method can proceed to end 1218.

In some embodiments, a processor in the mobile interactive services system can be operated to process a travel assistance request for communication to a satellite and terrestrial mobile communications network. The processor can be operated to process data related to multiple assistance providers that is received from the satellite and terrestrial mobile communications network in response to the travel assistance request. For example, the processor can process at least one criterion for an assistance provider based on a distance from a location of the assistance provider to where the travel assistance is desirable and/or an estimated travel time from the location of the assistance provider to where the travel assistance is desirable. The processor can process at least one criterion for an assistance provider based on historical trip data such as route segment data and destination area data, for example, and/or a rating or review provided by a COi. A display coupled to the processor can be operated to graphically represent data related to the assistance providers, such as, one or more criteria, a telephone number, an address, a website, a hyperlink, a multimedia feed, an email address, and/or estimated travel times, for example. In some instances, the data related to the assistance providers can be graphically represented a relative preference between assistance providers. An input device coupled to the processor can be operated to detect a selection of one of the assistance providers.

In other embodiments, a processor in a mobile interactive services system can be operated to process a travel assistance request for communication to a service center through a satellite and terrestrial mobile communications network. The processor can be operated to receive data related to an assistance provider from the service center through the satellite and terrestrial mobile communication network. An input device, an output device and/or the processor can be collectively operated to communicate with an operator at the service center. A display coupled to the processor can be operated to graphically represent the data related to the assistance provider, which may include location information in a navigation map, a telephone number, an address, a website, a hyperlink, a multimedia feed, an email address, an estimated time for the dispatched assistance vehicle to arrive where the assistance is desirable, and/or an estimated time to arrive at the location of the assistance provider, for example.

In other embodiments, a processor in a mobile interactive services system can be operated to process a travel assistance request for communication to a satellite and terrestrial mobile communications network. The processor can process data related to multiple assistance providers for graphical representation. The data related to the assistance providers can be received from the satellite and terrestrial mobile communications network in response to the travel assistance request. The processor can process a selection of one of the graphically represented assistance providers.

In other embodiments, a processor in a mobile interactive services system can be operated to process a travel assistance request for communication to a service center through a satellite and terrestrial mobile communications network. The processor can receive data related to an assistance provider from the service center through the satellite and terrestrial mobile communication network. The processor can process the data related to the assistance provider for graphical representation to assist the user.

Figure 13:
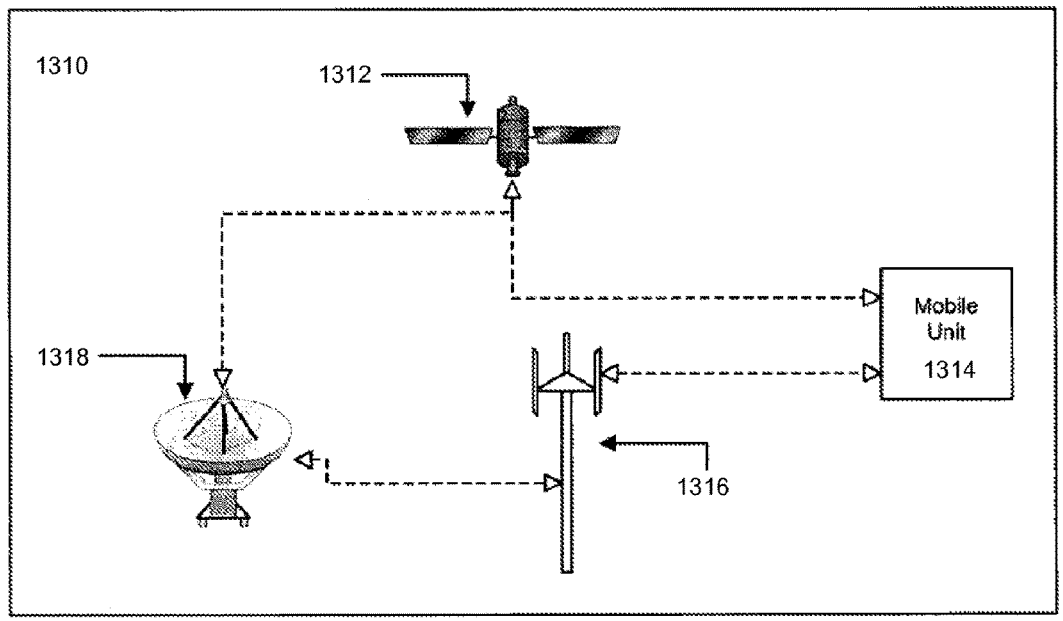
FIG. 13 is a diagram of a system for providing mobile interactive satellite services.

Referring to FIG. 13, a mobile interactive satellite services system 1310 includes a satellite 1312 to provide interactive communications with various mobile units 1314. The mobile interactive satellite services ("MISS") system 1310 includes an ancillary terrestrial component ("ATC") using one or more terrestrial base transceiver stations 1316 to expand coverage and/or capacity of the satellite 1312. A ground station 1318 handles communications with the satellite 1312 and with the terrestrial base transceiver stations 1316 such that a mobile unit 1314 may communicate with the satellite 1312 and/or the terrestrial base transceiver stations 1316.

The mobile interactive satellite services system 1310 may be used to provide any interactive wireless communication services, such as, voice communications, broadcast video, on-demand video, broadcast audio, on-demand audio, broadcast data, on-demand data, interactive advertising services, public safety communications, mobile emergency communications, and the like.

In one embodiment, an advanced geostationary MISS satellite covering North America and its S-Band spectrum position, together with an ATC component may provide mobile interactive and mobile multicast communication services to mobile units 1314. The space segment provides RF transport services between the ground stations 1318 and the mobile units 1314. In one embodiment, the space segment components may create from 1 to hundreds of spot beams with varying shape and gain across the United States and its territories. In the forward direction, it transmits digitized signals from the terrestrial network equipment. In the reverse direction, it receives signals from the mobile units 1314 and passes these on to the ground station.

In one embodiment, the satellite operates in the 10+10 MHZ of the 20+20 MHz satellite S-band. The satellite forward link is between 2180 MHz and 2200 MHz, and the satellite reverse link is between 2000 and 2020 MHz. The technical regulations of the MSS/ATC spectrum are described by 47 CPR, part 25, herein incorporated by reference.

The satellite 1312 may provide interactive and multicast capabilities to provide services. Communications between the satellite 1312 and the mobile units 1314 may be provided using any available communications technology including cellular-based technologies (e.g., CDMA 2000, CDMA EVDO, CDMA EVDO Platinum, DVB-H, WiMax, GSM, WCDMA, HSDPA, IDEN, FDMA, TDMA and the like); broadcast technologies (e.g., MediaFLO, DVB-H, DMB, Satellite Digital Radio, DAB, XM Radio, Sirius Radio, and the like); broadband technologies (e.g., WiMAX IEEE 802.16, WiFi IEEE 802.11, Flarion OFDM, IEEE 802.20, NexNet, Long Term Evolution, and the like); public safety communications technologies (e.g., P-25, iDEN, Tetra, and the like); and satellite communications technologies (e.g., GMR and variants, Inmarsat, S-UMTS, Qcom proprietary, DVB-S2, DVB-RCS, DVB-RCT, S-DMB, and the like).

The satellite and terrestrial network may be used to provide integrated applications combining streaming audio, video and other media content with interactive data services delivered to mobile units 1314, such as vehicles and portable handheld devices. To provide interactive services both upstream and downstream communication links are provided to mobile units 1314. In some implementations, the upstream and downstream communication links are implemented using the same technology. For example, using a two-way broadband networking technology, such as IEEE 802.20, data delivery and interactive services may both be provided using conventional IP networking. However, in some implementations, it is desirable to use a variety of communication techniques. For example, in an interactive multicast video system, it may be desirable to provide a multicast video downlink using multicast technologies, such as Digital Video Broadcasting ("DVB"), while using a broadband technology, such as IEEE 802.20, to provide interactivity and/or additional downlink services.

One skilled in the art will appreciate that any number of communication technologies may be used singly, or together in any combination in a MISS system 1310 to provide mobile interactive satellite services. Various components of the MISS system 1310 may be implemented using any existing or later developed communication technologies and protocols. For example, commercial off-the-shelf ("COTS") networking equipment could be used to implement communication links within the MISS system 1310, such as, a COTS WiMAX system may be used for one or more of the satellite communication links. Furthermore, portions of a MISS system 1310 may be implemented using third-party networks, such as, for example, broadcast feeds could be obtained from existing third-party networks, ancillary terrestrial coverage could be provided or could be augmented using existing third-party networks, etc. Additionally, a MISS system 1310 may be configured to use multiple networking technologies over multiple bands.

The terrestrial network includes the radio access equipment at the satellite ground station 1318, radio access equipment used in the terrestrial base transceiver stations ("BTS") 1316, the core network and applications services infrastructure and the mobile units 1314. The terrestrial base transceiver stations ("BTS") 1316 provide terrestrial communications between the ground station 1318 and mobile units 1314. The mobile units 1314 receive and demodulate signals and pass data to applications processors. In the reverse direction, applications processors in mobile units 1314 pass data for transmission to the modems in the mobile units 1314. The mobile units 1314 send modulated waveforms up to the BTS 1316, which in turn, forwards them to the ground stations 1318. The mobile units 1314 may be designed such that they can seamlessly communicate with the MISS system 1310 in the same manner regardless of whether the communication is taking place with satellite 1312 or with BTS 1316. This facilitates communications transparency, if desired, for a particular implementation, in that the mobile units 1314 may communicate with the MISS system 1310 without knowing whether such communications are made through the satellite 1312 or the BTS 1316.

In some implementations, multicast signals are transmitted by both one or more satellites 1312 and by multiple terrestrial BTS 1316 stations. These transmissions may be made using the same frequencies, or different sets of frequencies may be used. When the mobile unit 1314 transmits information, it may choose to transmit to a terrestrial network, to a satellite, or to attempt transmission to both. In this implementation, the mobile unit 1314 determines the most appropriate network to use and transmits information using that network. For example, if a mobile unit 1314 is in a suburban or an urban area with obstructed satellite visibility, the best network may be a terrestrial network. The mobile unit 1314 would transmit information to that terrestrial network. The MISS system 1310 may provide for handoff between two BTS stations 1316, between two satellites 1312, and/or between a satellite 1312 and a BTS station 1316. Any techniques for selecting networks and handing off between networks may be used.

Some implementations of the MISS system 1310 maintain a location service such that the last known location of a particular mobile unit 1314 is known. This may be used to enable unicast communication with a particular mobile unit 1314. This may be used, for example, to terminate telephony communications at a particular mobile unit 1314, to send a text message to a particular mobile unit 1314, and/or to send interactive data.

Multicast signals may be received by a mobile unit 1314 from various sources, such as, for example, from one or more satellite, from one or more terrestrial BTS, and through multiple antennas on or coupled to the mobile unit 1314. Furthermore, multiple signals may be received from a single source (e.g., a device may transmit the same information at multiple frequencies, at different polarities, at different points in time, and/or using different transmission antennas or combinations of antennas). The mobile unit 1314 may combine various received signals to increase reception performance. For example, one implementation of a mobile unit 1314 is operable to combine up to four received signals. A mobile unit 1314 may be implemented to combine any number of signals, or may be implemented without this functionality. These techniques may also be applied to interactive signals.

With respect to the terrestrial sites, there may be three different types of sites. Some may act as both multicast repeaters and two-way base stations. Others may act only as multicast repeaters or only as two-way base stations. Combined repeaters and two-way base stations may require two-way backhaul connections to the core network. The repeater component may be capable of receiving and demodulating the satellite signals and then transmitting it again to the mobile units 1314. For cases where the repeater is unable to receive the S-Band signal, such as in the use of a single frequency network in which the satellite and terrestrial repeaters are transmitting identical signals on the same frequency, the content may be delivered via alternate, potentially leased, satellite links or via terrestrial backhaul. A terrestrial backhaul is any data network, such as, for example, the Internet, a local area network, a virtual private network, a wide area network, or the like.

The ground station 1318 facilitates communications with the satellite 1312 and the terrestrial BTS 1316. Any communications technologies may be used between the satellite 1312 and the ground station 1318 to exchange information, such as, data to be transmitted by the satellite 1312 to one or more mobile units 1314; satellite telemetry, tracking, and control information; information received from one or more mobile units 1314; and the like. Likewise, any communications technologies may be used between the ground station 1318 and the BTS 1316 to transmit similar information. In addition to wireless technologies, the communications link between the ground station 1318 and the BTS 1316 may be made using non-wireless alternatives, such as, copper cable, fiber optic cable, an Internet connection, a local area network, a wide area network, a virtual private network, and the like.

In one implementation, for interactive services, the mobile unit 1314 always gives preference to the terrestrial network, if available, to ensure that the limited capacity of the satellite interactive link is reserved for users outside the coverage of the ATC network. The interactive core network has the capability to track the mobile units point of attachment to the network, either via satellite or terrestrial, allowing telephony or data sessions to be initiated from the core network to the mobile unit. Multicast services, which, in this implementation, are only delivered in the forward direction, can leverage advanced signal combining technologies to improve reception by evaluating both ATC and satellite signals simultaneously. Further, the system can leverage diversity antenna systems to provide increased signal gain by similarly combining multi-path signals.

Figure 14:
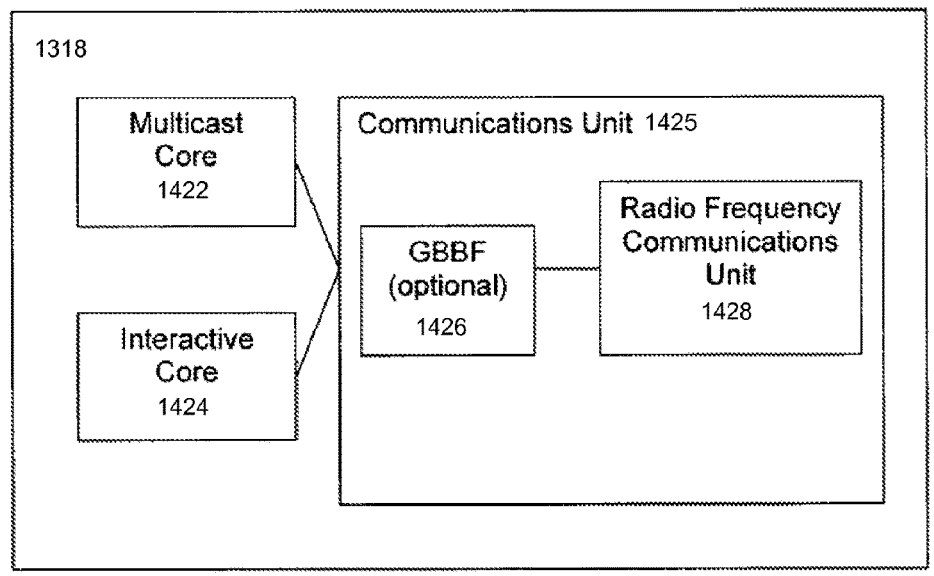
FIG. 14 is a diagram of a ground station for providing mobile interactive satellite services.

Referring to FIG. 14, one implementation of a ground station 1318 includes a multicast core 1422 that handles multicast-related communications, an interactive core 1424 that handles interactive-related communications, a communication unit 1425 that receives signals from the multicast core 1422 and the interactive core 1424 and facilitates transmission by the satellite 1312. In some implementations, the communication unit 1425 includes a ground-based beam-forming ("GBBF") unit 1426 that performs digital signal processing on signals received from the multicast core 1422 and the interactive core to facilitate multi-beam transmission by the satellite 1312. The communication unit 1425 also includes a radio-frequency communication unit 1428 to enable radio-frequency communication with the satellite 1312. Any advanced antenna technology may be used in place of, or in conjunction with the GBBF unit 1426.

The multicast core 1422 and the interactive core 1424 may be connected via a data network to facilitate various interactions and coordination between the two cores. The ground station 1318 also includes a telemetry, tracking and command ("TT&C") system. The output from the GBBF unit 1426 is passed to the radio frequency communications unit 1428 for transmission to the satellite 1312. Using GBBF unit 1426, the MISS system 1310 can be configured for spectrum reuse. For example, regional beams may be used to transmit multicast information over a fairly wide area, while narrow spot beams are used for interactive services. Narrow spot beams allow frequency reuse, thus increasing capacity. Some implementations may use overlapping spot beams of various sizes.

Generally, the MISS system 1310 may use any advanced antenna technology including ground-based or satellite-based beam-forming, MIMO, and the like. In one implementation, multiple feed horns are used. Radio signals are processed using a matrix multiplier (beam former) to calculate a signal for each feed horn such that the signals from each feed horn create interference patterns that effectively provide one or more focused beams of radio frequency energy. In this implementation, beams are defined statically through system configuration. One skilled in the art will appreciate that any advanced antenna technology may be used with a MISS system 1310.

The MISS system 1310 may be implemented without separating the functionality of the multicast core 1422 and the interactive core 1424 as shown in FIG. 14; however, for some implementations, the processing capabilities, requirements, and functionalities of the multicast core 1422 and interactive core 1424 will be sufficiently different that it will be desirable to separate the functionality as shown. The multicast core 1422 handles information destined for a group of mobile units 1314. For example, in an audio multicast implementation, the multicast core 1422 would prepare audio information for multicast to groups of mobile units 1314 based on, for example, subscriptions for those units. The interactive core 1424, in contrast, handles interactivity, such as, requests for information, votes, messages, posts, and the like.

The terrestrial core system may include applications infrastructure, including servers and computers and telecommunications equipment and IP networking equipment. The terrestrial core system may be connected to the Internet via access servers. The terrestrial core network is responsible for end user applications and operations systems, such as, provisioning, authentication and billing, and interconnect between operations centers and external networks, such as the Internet.

In one embodiment, a multicast link can be multicast using a single beam, while the interactive link is shown using multiple spot beams, 1532, for example. The multicast link provides for content delivery throughout a broad coverage area. The spot beams minimize interference and support interactive two-way traffic. Such a system may support 1 Mbps interactive traffic and 5 Mbps multicast traffic. The satellite and terrestrial components can be deployed to share portions of the same spectrum, such as the terrestrial BTS 1316 and satellite 1312 shown in FIG. 13. The satellite and terrestrial segments may share portions of the frequency spectrum or be placed in separate bands.

Using the MISS system 1310 as described above, a wide variety of interactive services may be supplied by a satellite-based system. Specific implementations are provided below for purposes of explanation; however, they are not intended to be limiting. One skilled in the art will understand and appreciate that many additional mobile interactive satellite services are within the scope of this disclosure.

Multicast Video Implementation

In one implementation of a mobile interactive satellite services system 1310, multicast video is provided to mobile units 1314 in conjunction with various interactive services. Similar to existing video distribution services (such as, cable television, broadcast television, IPTV, and the like), a MISS system 1310 provides multiple channels of multicast video which are multicast to mobile units 1314, such as handheld devices, computers, personal digital assistants, vehicles (e.g., cars, public transportation systems, airplanes, buses, and the like), televisions, Video iPods, a digital video recorder, and the like.

Figure 15:
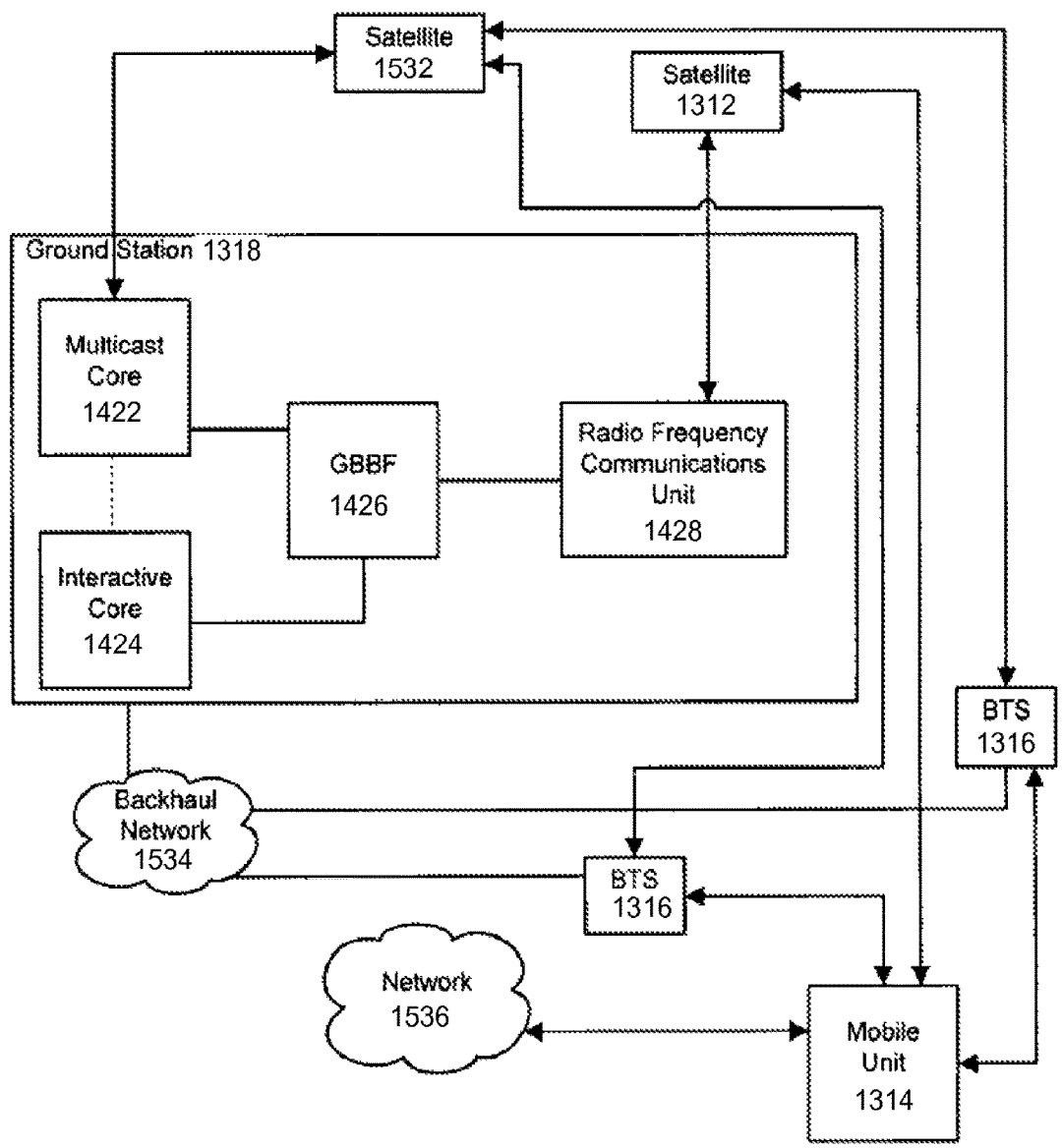
FIG. 15 is a diagram of a satellite-based mobile interactive multicast video system.

Referring to FIG. 15, a satellite 1312 transmits multicast video for reception by mobile unit 1314 using broadcast technology, such as, MediaFLO, DVB-H, DVB-SH, DVB-S2, DMB, MPEG2, MPEG4, and the like. Video is channelized, typically by multiplexing IP Multicast streams, such that various programs are simultaneously transmitted. The mobile units 1314 can be used to receive one or more programs for playback.

Figure 16:
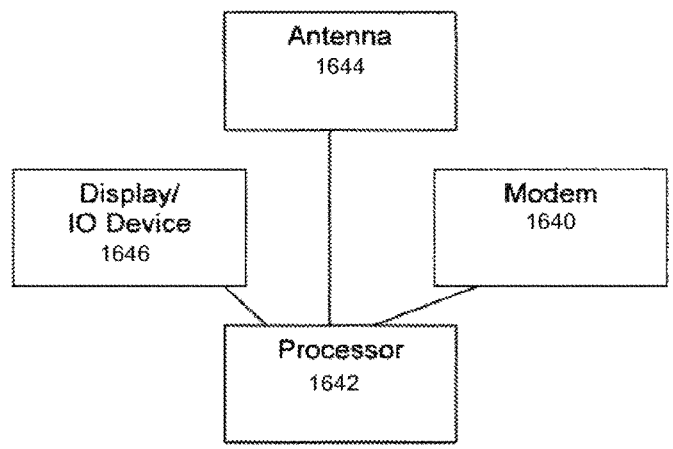
FIG. 16 is a block diagram of a mobile unit for use in a satellite-based mobile interactive multicast video system.

The mobile unit 1314 may be implemented as a television-like device that receives a channel selected by a viewer and displays the video multicast on the selected channel to a viewer. The mobile unit 1314 could be, for example, a conventional personal computer, a personal data assistant, wireless phone, mobile device, portable electronic game device, satellite set top box or electronic tablet or combinations of any of the above operably in communications with one another. The mobile unit 1314 may be implemented with digital video recorder ("DVR") functionality. For example, a two-tuner DVR mobile unit 1314 may be used to record programs. Using two tuners, two programs may be recorded simultaneously, or one program may be recorded while viewing a live multicast. In one embodiment, the mobile unit 1314 is installed in a vehicle such as an automobile. As shown in FIG. 16, the mobile unit 1314 has four major components: modem 1640, processor 1642, antenna 1644 and display/IO device 1646. The modem 1640 performs the terrestrial and satellite radio functions. It receives and transmits radio signals via an antenna 1644 and passes demodulated, decompressed, decoded applications programs and content to a processor 1642. The processor 1642, which includes storage and application processing capabilities, communicates by way of wired and wireless connection to display and input/output devices 1646. As mentioned above, the modem 1640 may implement one or more air interfaces that support both terrestrial and satellite multicast and interactive functions. The modem 1640 also may performs such functions as switch diversity, advanced combining techniques, and stream comparison between terrestrial and satellite radio paths. The modem 1640 may contain transmit and receive amplifiers for communication with the satellite and terrestrial network via the antenna. The processor 1642 may run standard operating systems such as Microsoft Windows, Linux, VxWorks, and the like. In one embodiment, the processor supports at least 16 Gbytes of storage and 1 Gbytes of RAM. Further, the processor may include flexible I/O interfaces including the ability to add other standard modems such as CDMA EVDO and HSDPA devices. It may be further capable of interfacing to wireless display, keyboard and remote-control devices or via hardware connection to composite video and pin style audio interfaces.

Figure 17:
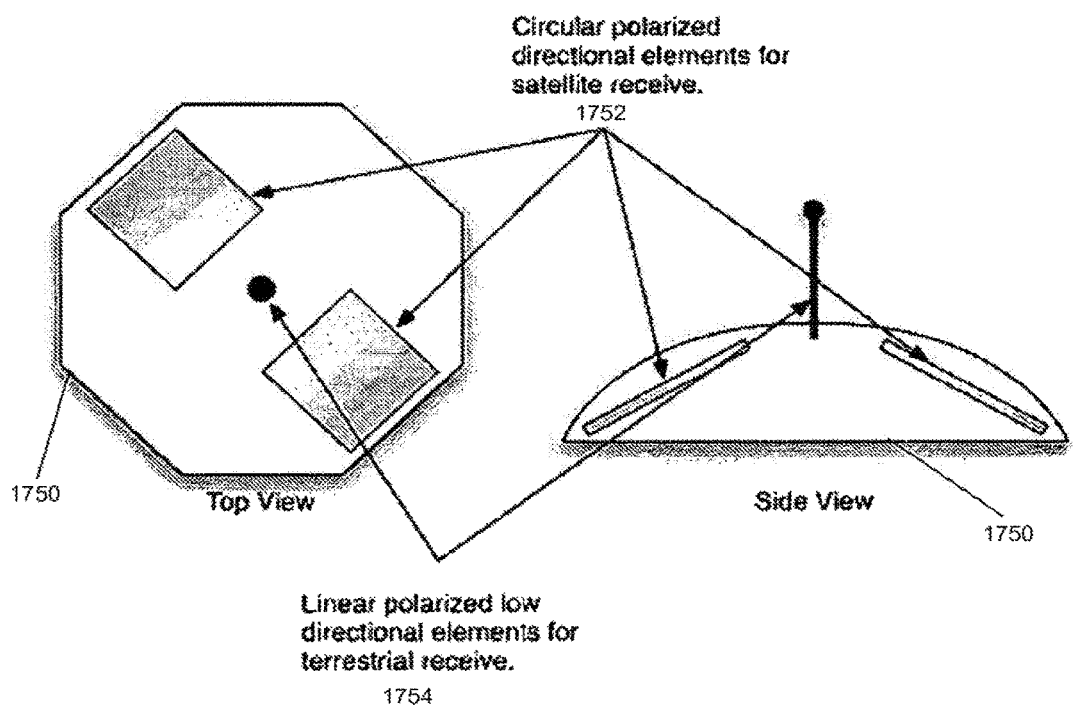
FIG. 17 is a diagram of a mobile antenna for use with a satellite-based mobile interactive multicast video system.

Referring to FIG. 17, a multi-element antenna 1750 may be used having one element 1754 that is linearly polarized for communication with terrestrial base transceiver stations, and a second element 1752 that is circularly polarized for communication with one or more satellites. In this manner, antenna 1750 provides improved performance for both terrestrial and satellite communications.

When the mobile unit 1314 is in a vehicle, the processor may be capable of being mounted in a vehicle trunk with wired connections to the antenna and a power system and wireless or wired connections to the display device.

The display of the mobile unit 1314 may be a conventional display and other I/O devices which can communicate by way of wireless or hardware composite video connection to the processor. In the vehicle embodiment, the display may be implemented, for example, using a panel of at least 7 inches in diagonal with a 16:9 aspect ratio and 853 by 480-pixel resolution. However, other display characteristics and features are also covered.

Other implementations of the device include, but are not limited to, portable media players with integrated or external modems and/or antenna, mobile telephones, portable electronic game devices, and ultra-mobile PCs.

In this multicast video implementation, a ground station 1318 includes a multicast core 1422 which receives broadcast video content from, for example, local sources (e.g., DVDs, tapes, CDs, digital storage media, and the like), video feeds (e.g., satellite feeds, point-to-point links, computer network feeds, and the like), etc. The multicast core 1422 then forwards assembled and transcoded content to the GBBF 1426 for processing. The ancillary terrestrial component would not require the same beam-forming processing. Accordingly, in this implementation, information is also forwarded to satellite 1532 for transmission to terrestrial base transceiver stations 1316.

Consider, for example, a video multicast system that provides content that varies between three geographical regions. The content for each of the three regions is sent to the GBBF 1426 to perform digital processing such that the satellite 1312 can transmit the data in three regional conus beams. However, transmissions from a terrestrial BTS 1316 are typically local in extent, therefore each BTS 1316 resides in a single region. Accordingly, each BTS 1316 receives multicast information for a single region and processing by the GBBF 1426 is not necessary. In this implementation, information destined for a BTS 1316 is sent through satellite 1532. In additional implementations, this information may be sent across one or more terrestrial-based networks or through the satellite 1312.

In some implementations, each BTS 1316 or groups of BTS 1316 in a MISS system 1310 may transmit differing content.

In addition, the ground station 1318 includes an interactive core 1424 coupled to a backhaul network 1534. The backhaul network 1534 is used to transmit interactive data between a BTS 1316 and the interactive core 1424. Interactive communication between a mobile unit 1314 and the ground station 1318 may go through satellite 1312 or through a BTS 1316.

Interactivity for multicast services may be delivered to the mobile unit 1314 in a number of different ways. For example, multiple video programs can be compressed into MPEG2 or MPEG4 streams, for example, and multicast to the mobile units with data commands. At certain points during the video, a switch can be made to another video stream with different content. Such applications such as interactive video advertising can make use of multiplexed related digital video streams.

Carouselling is a well-known technique for delivering interactive programs to receiver devices, such as mobile unit 1314. With carouselling, compressed video signals, audio signals and interactive program modules, including interactive software and/or data, are packetized and time division multiplexed at the interactive core 1424 for transmission. These programs can be repetitively transmitted so that a mobile unit 1314 can download the program at any time and store them in memory. Such programs can be controlled at the mobile unit 1314 upon receipt of special signal commands in the multicast. The mobile unit 1314 can monitor the multicast stream for special commands. Upon receipt of commands, the mobile unit 1314 can effectuate any state change in the program including starting execution of the interactive program, suspend execution, halt execution, or other states.

User applications may include general purpose and interactive applications. General purpose applications may include video encoding management, digital rights management, subscriber management, voice, messaging, geo-location, m-commerce, provisioning, authentication, authorization, billing, network management, and the like. Further, applications may also support specific end-user services. The satellite and terrestrial component subsystems may operate interconnect in a public or private IP-based network.

A variety of interactive services may be included, such as, any of the following services set forth below, or the like. Media and extended media applications may be included such as real time video or other media sent from satellite and terrestrial repeaters and interactive applications which complement media services. Mobile service applications may be included such as (1) GPS driving directions with integrated traffic data, and (2), restaurant, shopping, entertainment and other services with integrated location and messaging. Communications and safety services may also be provided including the following: (1) emergency communications with public safety agencies; (2) telematics and other vehicle data ranging from theft notification and response to maintenance interactions with support systems;

(3) person to person messaging; (4) voice and emergency voice communications; and (5) telephony (e.g., voice communications through the PSTN, and/or the Internet). Additionally, the mobile units 1314 may include applications that allow for transmitting or receiving content and data from other mobile devices or home networking devices via WiFi or other network interfaces. Mobile units 1314 may also include applications allowing high speed Internet access with streaming services and integration with cellular service via common IP core networks.

Signals from the interactive core and the multicast core may be used to provide a seamless interactive service. When data from the interactive core and the multicast core are used together, it may be desirable to provide some mechanism to coordinate the data. For example, when a user is viewing multicast video programming that includes an interactive voting or polling element, the system may need some coordination such that the interactive aspects of voting are displayed at the appropriate times. There are many techniques that would be known to one skilled in the art. For example, the multicast signal may be augmented with queues that indicated when to insert or active interactive components. This coordination and integration between multicast and interactive components will vary depending on the particular data being delivered. One skilled in the art will understand how to effectively coordinate the multicast and interactive components.

Sample applications may include interactive voting. The mobile unit 1314 includes one or more user input devices to allow a viewer to vote. This may be used, for example, to poll the audience as used by popular programs, such as American Idol; however, in an interactive multicast video system, this may be performed in real-time.

Second, interactive services may be used to allow a viewer to request additional information regarding a television show, a featured product, an advertisement, or the like.

Third, interactive services may be used to allow a user to request information unrelated to the current multicast, such as, the current weather, traffic conditions, upcoming programs, stock quotes and other information services, e-mail, messages, voicemail, or the like.

Fourth, interactive services may be used to allow a viewer to send requests to online information sources. For example, a viewer may use interactive services to request universal resource locators ("URLs") across the Internet through a web browser.

Fifth, interactive services may be used to augment multicasts with information for a particular user or for a particular region. For example, the satellite 1312 or the BTS 1316 may send users public safety-related messages for their area. In the case of an amber alert, hurricane, earthquake, civil unrest, war, etc., the satellite 1312 can steer a spot beam to an affected area (using the GBBF 1426). The spot beam can then multicast information related to the event to viewers in the affected area. Similarly, the interactive core 1424 can send information through the backhaul network 1534 to each BTS 1316 in the affected area so that the BTS 1316 can send analogous public safety information.

Sixth, interactive services may be used to allow a viewer to purchase a product, service, information access, or the like.

Furthermore, implementations may use location awareness at the mobile unit 1314 to vary service offering. For example, location awareness may be used to filter information and present only that information which meets certain criteria, such as a defined geographical coverage area, proximity to a particular geolocation, etc. Location awareness may be used to limit or customize service based on a mobile unit's 1314 location. Location awareness allows services to be varied based on geographical areas. This allows regional blackouts or targeting services to a limited geographical area. This ability may be used, for example, to comply with contractual obligations (e.g., sports blackouts, licensing limitations, etc.), to comply with legal or regulatory restrictions (e.g., preventing unlicensed multicasts), to target or customize services for a particular geographical area, and the like.

One skilled in the art will understand that any interactive communications services (such as, any Internet service, any interactive data service, any interactive voice service, any interactive video service, or the like) could be used with the MISS system 1310.

Interactive multicast video services may be provided using, for example, the techniques described in U.S. Pat. No. 7,017,175, which is hereby incorporated by reference in its entirety for all purposes. In this implementation, mobile units 1314 communicate with application servers using light versions of conventional Internet protocols. For example, a light hypertext transport protocol ("HTTP") and/or a user datagram protocol ("UDP"). These allow interactive communication between one or more application servers and mobile units 1314. Implementations may provide "push" technology whereby targeted content may be pushed to a mobile unit 1314. This would allow, for example, the display of targeted advertising. Additionally, using HTTP, a light version of the HTTP protocol, UDP, or the like, a mobile unit 1314 can receive information, request information, submit information, etc.

In some implementations, the mobile unit 1314 may be configured to perform side loading. Side loading is the ability to load content or information for use by the mobile unit 1314 through some mechanism other than satellite 1312 or BTS 1316.

In this implementation, side loading is enabled using network 1536, which may be implemented using any communications technology. Furthermore, a mobile unit 1314 may include the ability to side load from more than one such network 1536. By augmenting mobile unit 1314 with a network interface device, such as, a WiFi IEEE 802.11 interface, a WiMAX IEEE 802.16 interface, a GSM interface, a CDMA EVDO interface, or the like, the mobile unit 1314 may connect to one or more networks 1536 to download additional content. Side loading may be used, for example, for background downloading of content. For example, in one implementation, a vehicle-mounted device uses a WiFi link to a user's home Internet connection to download content from servers in the core network while the vehicle is parked in a garage (or otherwise in range of the WiFi network). In this manner, the user may have fresh content loaded into a device, ready for playback when they drive away in the morning.

A wide variety of information may be transmitted to mobile units 1314 using side loading including those set forth below, and the like. Side loading may be configured to automatically download content selected by a service provider, to download user-selected content, content based on collected user preferences, and/or the like.

First, advertisements may be loaded onto mobile units 1314 such that targeted advertising may be displayed during video multicast, between video multicasts, or during the display of any information. Advertising may be targeted using such information as, the viewer's profile, the location of the mobile unit 1314, the program currently being viewed, and the like. For example, if a viewer is watching a children's television program, age-appropriate advertisements may be displayed. If the mobile unit 1314 is nearing a rest stop, an advertisement for services provided by the rest stop may be displayed.

Second, recorded video programs may be loaded onto mobile units 1314. For example, a vehicle entertainment system mobile unit 1314 with a WiFi interface can connect to a local area network in a home and download information across a home network, such as, recorded programs from a digital video recorder; recorded programs from a computer; recorded programs retrieved across the Internet; music or other audio programming available from DVRs, computers, or other devices; or the like. Side loading may be performed using existing protocols (such as, for example, UPNP) or through proprietary protocols.

Third, system updates may be loaded onto mobile units 1314 using side loading. This would allow software upgrades, system maintenance, etc., to take place across a network other than a satellite-based MISS system 1310. Furthermore, side-loading may be used to update additional systems, such as, a navigation system, a vehicle computer system, a vehicle entertainment system, or the like.

Mobile interactive satellite services may be augmented using information obtained through side-loading. For example, information obtained by side-loading may include targeted advertisements such that a mobile unit 1314 may insert a targeted advertisement during playback of a multicasted signal.

Side-loading may also be used to provide DVR-like functionality. For example, a mobile unit 1314 in an automobile is typically only driven for a short portion of the day. It is likely that a subscriber would desire to watch programming that is shown at another time of the day than that when the mobile unit 1314 is being used. Thus, some DVR-like functionality is desirable. One solution would be to simply record shows when they are multicasted and store them such that they may be viewed when desired. Another solution is to download shows (either through an on-demand-like system, or from a PVR-like device where the shows have been recorded) through side-loading.

Interactive Mobile Assistance

Some implementations of the MISS system 1310 provide interactive mobile assistance (e.g., travel assistance, emergency assistance, and the like) to users of mobile units 1314, either in addition to the multicast video services described above, with other services, or as a standalone service.

For example, using the interactive core 1424, a MISS system 1310 can provide voice services to mobile units 1314. This would allow telephonic communications, emergency communications (e.g., 911 calls, calls for tow trucks, vehicle tracking, vehicle disabling, vehicle locking/unlocking, and the like), or requests for information (e.g., calls to a concierge, calls for travel directions, calls for restaurant recommendations, calls for hotel reservations and recommendations, and the like). Simultaneous with the voice communications, data can be transmitted to the receiving party including, but not limited to location, vehicle diagnostics, images, and/or video. Mobile Assistance services may also be provided using text message or automated telemetry. For example, one system may send an emergency distress message including location information and a still image from an in-car camera when a vehicle's air bag(s) are deployed.

In some implementations of a Mobile Assistance system, a mobile unit 1314 uses the MISS system 1310 upon the occurrence of predefined triggers. For example, predefined triggers may include various vehicle data bus events, such as, for example, airbag deployment, fuel warnings (e.g., low gas, out of gas), errors, engine malfunction codes, and the like.

In some implementations the mobile unit 1314 is designed such that the radio unit can be removed from the vehicle and operated in a standalone mode. For example, if a user were to drive off the road in a remote area outside satellite coverage, they could remove a device from the car and carry it to an area in satellite coverage. When the mobile unit 1314 is operated from vehicle power and includes various inputs and outputs to devices and/or subsystems within the vehicle, the functionality of the mobile unit 1314 may be limited when operating in standalone mode. For example, in some implementations, the mobile unit 1314 operating in standalone mode may be used to initiate an emergency distress call using a very limited subset of features in the device.

Additionally, the Mobile Assistance system may be used to provide services similar to LoJack or Mobile Guardian. The mobile unit 1314 may communicate with a MISS system 1310 to track a vehicle, to help recover vehicle, to remotely enable/disable a vehicle, to remotely unlock a vehicle, and the like.

Mobile Interactive Media Implementation

One implementation of a mobile interactive satellite system 1310 provides three main services to vehicles: (1) video delivery; (2) navigation; and (3) vehicle safety services. Previous attempts to provide mobile video have struggled to reduce device sizes, extend battery life, and improve coverage sufficiently to provide a commercially viable service. Providing mobile video to vehicles overcomes problems of device size and battery life. Additionally, the mobile interactive satellite system 1310, such as that described above, provides improved coverage through the use of an ancillary terrestrial component.

This implementation provides satellite video delivery, terrestrial video delivery, as well as the side-loading of additional content. By providing terrestrial video delivery and side-loading, the system provides DVR functionality to time-shift content, thus giving subscribers video content that they want. In this manner, subscribers are not limited to simply watching available satellite video broadcasts and more content may be made available to subscribers than would be available in a multicast-only system.

Conventional navigation systems provide static data that may be updated periodically, for example, by purchasing annual DVD or CD updates. However, Internet users have become less tolerant of stale, static data. Using a mobile interactive satellite service 1310, a navigation system can be provided having two-way interactivity. This will allow, not only, the availability of real-time navigation data, but also new services allowing collaboration on the creation of micro-niche data sets. From street food vendors to clean bathrooms, real-time geo-localized datasets may be provided to consumers using this implementation of a mobile interactive satellite service 1310.

One skilled in the art will appreciate how the two-way interactivity of this system can be used to provide a wide variety of interactive navigation systems. In addition to collaboration, navigation may be targeted based on user preferences, profiles, or tastes, and navigation may be modified in real-time based on weather, traffic, warnings from other users, or the like. Many additional interactive navigation systems will be apparent to one skilled in the art.

Finally, this implementation provides vehicle safety services. For example, the mobile interactive satellite system 1310 may be used to provide services like those provided by conventional vehicle safety systems, such as, OnStar. However, using two-way interactivity, this implementation provides many additional features. For example, the system is operable to send notifications of dangerous conditions.

Consider, for example, a weather emergency such as a hurricane. The MISS system 1310 may be used to communicate emergency information, such as, for example, text messages, satellite images, video footage, traffic information, and the like. This information may be multicast over the entire service area of the MISS system 1310, over one or more predefined beams, or a spot beam can be specially configured to cover an affected geographical region. Additionally, interactive information services may be provided as described above, for example, emergency responders and/or the public may use the MISS system 1310 to provide interactive communications and services. By integrating this functionality with its navigation components, this system can assist subscribers in avoiding dangers.

Figure 18:
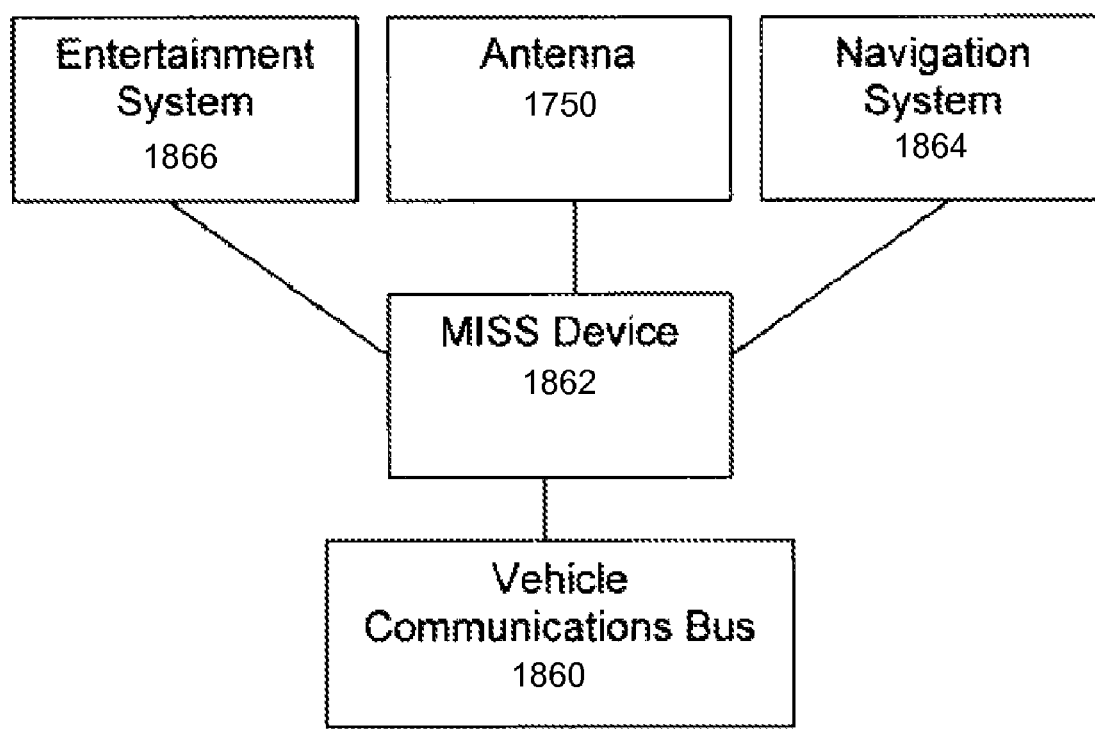
FIG. 18 is a block diagram of a mobile interactive media system.

Referring to FIG. 18, in some implementations, a vehicle communication bus 1860 is integrated with a MISS device 1862. The MISS device 1862 is coupled to an antenna 1750, a navigation system 1864, and an entertainment system 1866. The vehicle communication bus 1860 may be implemented using any protocol or technique, such as, for example, CAN, ODBII, MOST, or the like.

Portable Interactive Video Implementation

One implementation of a MISS system 1310 provides interactive multicast video services to portable handheld devices. A mobile unit 1314 is configured with a display screen such that the mobile unit 1314 may receive multicast audio and/or video from a satellite 1312 or from a terrestrial BTS 1316. For example, using the mobile unit 1314, a subscriber may choose between a number multicast video programs.

Some implementations of a portable interactive video system may provide the ability to side-load content and/or data (e.g., using a USB port, a data network, or the like). The mobile unit 1314 provides various interactive services such as those described above. Additionally, the mobile unit 1314 may be configured to provide telephony services and/or emergency voice communications services. Furthermore, some implementations of the mobile unit 1314 provide security services such as, for example, location reporting, tracking, theft recovery, or the like.

A number of implementations have been described. Nevertheless, it will be understood that various modifications may be made without departing from the spirit and scope of the invention. Accordingly, other implementations are within the scope of the following claims.

CONCLUSION

While various embodiments of the invention have been described above, it should be understood that they have been presented by way of example only, and not limitation. For example, the mobile interactive services device described herein can include various combinations and/or sub-combinations of the components and/or features of the different embodiments described. Although described with reference to use with an MSS/ATC system, it should be understood that the mobile interactive travel assistance services and the mobile interactive services device, as well as the methods of using the mobile interactive travel assistance services and the mobile interactive services device can be used with other wireless network systems.

Embodiments of a mobile interactive travel assistance service can also be provided without the mobile interactive services device described herein. For example, a mobile interactive travel assistance service can be configured to be used with other suitable controllers, vehicle consoles, handheld devices, laptop computers, etc., not specifically described herein. Data from a mobile interactive travel assistance service can be accessed, processed, displayed, and/or selected in a different manner than as illustrated and described herein. A mobile interactive travel assistance service can also be provided with other interactive features and/or services such as, for example, navigation services.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

What is claimed is:

1. A computing device comprising:
   a display device; and
   a processing module configured to generate an interactive map identifying at least one route segment for display on the display device;
   wherein the at least one route segment is generated in view of a current location of the computing device and a specific destination area;
      wherein the specific destination area is a geographic region within which two or more destinations are located;
   wherein the at least one route segment is generated based on historical trip data associated with only the computing device;
   wherein the at least one route segment:
      occurs within the specific destination area; and at least one of:
      first connects the current location of the computing device with at least one destination selected from the two or more destinations within the specific destination area; and
      second connects the current location of the computing device with at least one service provider located within the specific destination area and between the current location and the at least one destination;

wherein the at least one service provider is an entity that has previously provided service to a user of the computing device;

wherein the processing module is configured, upon receiving a selection of at least one of the route segment, the specific destination area, the at least one destination, and the at least one service provider, to activate at least one process for execution by the computing device.

2. The computing device of claim 1, comprising:

a navigation module, coupled to the processing module;

wherein the at least one process instructs the navigation module to generate directions between the current location and the selection.

3. The computing device of claim 2, wherein the navigation module is configured to output the directions in one or more humanly perceptible instructions presented in at least one of a visual format and an audible format.

4. A computing device comprising:

a display device;

a processing module configured to generate an interactive map identifying at least one route segment for display on the display device;

wherein the at least one route segment is generated in view of a current location of the computing device and a specific destination area;

wherein the specific destination area is a geographic region within which two or more destinations are located;

wherein the at least one route segment, at least one of:

occurs within the specific destination area;

first connects the current location of the computing device with at least one destination selected from the two or more destinations within the specific destination area; and second connects the current location of the computing device with at least one service provider;

wherein the at least one service provider is an entity that has previously provided service to a user of the computing device;

wherein the at least one route segment is based on historical trip data;

wherein the historical trip data is based on one or more trips for only the computing device;

wherein the processing module is configured, upon receiving a selection of at least one of the route segment, the specific destination area, the at least one destination, and the at least one service provider, to activate at least one process for execution by the computing device;

wherein the historical trip data includes two or more ratings of the at least one route segment; and wherein the two or more ratings are provided by the user of the computing device.

5. A computing device comprising:

a display screen;

the computing device being configured to generate and display an interactive map identifying at least one route segment;

wherein the at least one route segment is generated in view of a current location of the computing device and a specific destination area;

wherein the specific destination area is a geographic region within which two or more destinations are located;

wherein the at least one route segment is generated based on historical trip data associated with only the computing device;

wherein the at least one route segment:

occurs within the specific destination area;

first connects the current location of the computing device with at least one destination selected from the two or more destinations within the specific destination area; and second connects the current location of the computing device with at least one service provider;

wherein the at least one service provider is an entity that has previously provided service to a user of the computing device;

wherein the computing device is configured, upon receiving a selection of at least one of the route segment, the specific destination area, the at least one destination, and the at least one service provider, to activate at least one process for execution by the computing device wherein the current location of the computing device is within the specific destination area; and wherein the specific destination area is a routine destination area associated with the computing device.

6. The computing device of claim 5, wherein the at least one route segment includes multiple segments arising within the specific destination area.

7. The computing device of claim 1, wherein the processing module is configured to generate the interactive map a current location of the at least one service provider.

8. A computing device comprising:

a display device; and a processing module configured to generate an interactive map identifying a route segment for display on the display device;

wherein the route segment is generated in view of a current location of the computing device and a specific destination area;

wherein the specific destination area is a geographic region within which two or more destinations are located;

wherein the route segment, at least one of:

occurs within the specific destination area;

first connects the current location of the computing device with a destination selected from the two or more destinations with the specific destination area; and second connects the current location of the computing device with a service provider;

wherein the service provider is only selected from one or more entities that have previously provided service to a user of the computing device;

wherein the computing device is configured, upon receiving a selection of the route segment, the specific destination area, the destination, and the service provider, to activate at least one process for execution by the computing device;

wherein the processing module is configured to generate, for display on the interactive map, a current location of the service provider;

wherein upon selection of the service provider, the computing device performs at least one additional process comprising:

displaying contact information for the selected service provider;

displaying an estimated time of arrival for the selected service provider at the current location of the computing device;

activating a communications link between the computing device and the selected service provider; and periodically displaying at least one update to the current location of the selected service provider.

9. The computing device of claim 8, wherein the selected service provider provides transportation related services.

10. The computing device of claim 1, wherein the computing device is configured to identify the at least one route segment based on a road type.

11. The computing device of claim 1, wherein the computing device is configured to identify the at least one route segment based on a time of day.

12. The computing device of claim 11, wherein the time of day is a current time associated with the current location of the computing device.

13. The computing device of claim 1, wherein the computing device is operable to generate the at least one route segment by processing a criterion for the at least one service provider based on data related to the at least one service provider and the historical trip data; and wherein the historical trip data includes at least one of route segment data and destination area data.

14. A computing device comprising:

a display device; and a processing module configured to generate an interactive map identifying a route segment for display on the display device;

wherein the route segment is generated in view of a current location of the computing device and a specific destination area;

wherein the specific destination area is a geographic region within which two or more destinations are located;

wherein the route segment, at least one of:

occurs within the specific destination area;

first connects the current location of the computing device with a destination selected from the two or more destinations within the specific destination area; and second connects the current location of the computing device with a previously used service provider;

wherein the previously used service provider is only selected from one or more entities that have previously provided service to a user of the computing device;

wherein the computing device is configured, upon receiving a selection of the route segment, the specific destination area, the destination, and the previously used service provider, to activate at least one process for execution by the computing device;

wherein the computing device is configured to consider historical data when generating and identifying the route segment; and wherein the historical data is associated with at least one previous trip of the computing device arising between the current location of the computing device, the specific destination area, the destination, and the previously used service provider.

15. The computing device of claim 14, wherein the historical data is associated with at least one of a departure time, a departure day, a departure week and a departure year.

16. The computing device of claim 14, wherein the historical data is obtained from a navigation service provider.

17. The computing device of claim 1, comprising: an input device and an output device, the input device and the output device being configured to facilitate communications between the at least one previously used service provider and a user of the computing device via at least one of a cellular based communications technology and a broadband communications technology.

18. The computing device of claim 1, wherein the computing device is configured to track:

the computing device while the computing device travels along the route segment to at least one of the specific destination area and a selected one of the at least one destination; and one or more responders traveling along the route segment;

wherein the responders are dispatched by at least one of:

an emergency services provider;

a travel assistance service center; and a selected service provider.

* * * * *